United States Patent
Bijl et al.

(10) Patent No.: US 11,633,929 B2
(45) Date of Patent: Apr. 25, 2023

(54) BEAD-APEX STORAGE SYSTEM AND METHOD FOR HANDLING A PLURALITY OF STACKS WITH BEAD-APEXES AND SPACERS

(71) Applicant: VMI HOLLAND B.V., Epe (NL)

(72) Inventors: Keimpe Theunis Bijl, Epe (NL); Antonius Willibrordus Joseph Stout, Epe (NL)

(73) Assignee: VMI HOLLAND B.V.

(*) Notice: Subject to any disclaimer, the term of this patent is extended or adjusted under 35 U.S.C. 154(b) by 0 days.

(21) Appl. No.: 17/614,957

(22) PCT Filed: Apr. 2, 2020

(86) PCT No.: PCT/NL2020/050224
§ 371 (c)(1),
(2) Date: Nov. 29, 2021

(87) PCT Pub. No.: WO2020/242294
PCT Pub. Date: Dec. 3, 2020

(65) Prior Publication Data
US 2022/0234317 A1    Jul. 28, 2022

(30) Foreign Application Priority Data
May 28, 2019    (NL) .................................. 2023215

(51) Int. Cl.
*B29D 30/00*    (2006.01)
*B65G 59/00*    (2006.01)

(52) U.S. Cl.
CPC ....... *B29D 30/0016* (2013.01); *B65G 59/005* (2013.01); *B29D 2030/0044* (2013.01)

(58) Field of Classification Search
CPC .............................................. B29D 2030/0044
See application file for complete search history.

(56) References Cited

U.S. PATENT DOCUMENTS

| 4,553,894 A | 11/1985 | Mukae et al. ................. 414/331 |
| 5,631,028 A * | 5/1997 | Mizokawa ......... B29D 30/0016 425/29 |

(Continued)

FOREIGN PATENT DOCUMENTS

| CN | 103476576 | 12/2013 | ............. B29D 30/70 |
| CN | 106827603 B * | 1/2019 | |

(Continued)

OTHER PUBLICATIONS

ESpaceNet Translation of CN 106827603 (Year: 2022).*

(Continued)

*Primary Examiner* — Robert C Dye
*Assistant Examiner* — Alexander D Booth
(74) *Attorney, Agent, or Firm* — Hayes Soloway P.C.

(57) ABSTRACT

Disclosed is a bead-apex storage system and a method for handling carriers, each carrier supporting a stack of bead-apexes stacked in a stacking direction and alternated with spacers separating the bead-apexes, wherein the bead-apex storage system includes a plurality of storage stations for storing the carriers and a transfer station for transferring one of the plurality of bead-apexes to a tire building machine, wherein the bead-apex storage system further includes a spacer gripper for lifting one or more of the spacers from one of the carriers in one of the plurality of storage stations and for carrying said one or more lifted spacers to the transfer station, wherein the bead-apex storage system includes a spacer gripper base for supporting the spacer gripper, wherein the spacer gripper base is movable from the transfer station to any one of the plurality of storage stations.

38 Claims, 22 Drawing Sheets

(56) References Cited

U.S. PATENT DOCUMENTS

| | | | |
|---|---|---|---|
| 2007/0272345 A1 | 11/2007 | Sawada | B29D 30/48 |
| 2009/0314436 A1 | 12/2009 | Tatara et al. | B29D 30/18 |
| 2014/0034220 A1 | 2/2014 | Mancini et al. | B29D 30/24 |
| 2022/0234317 A1 | 7/2022 | Bijl et al. | B29D 30/00 |

FOREIGN PATENT DOCUMENTS

| | | | | |
|---|---|---|---|---|
| CN | 213383105 | 6/2021 | ............ | B29D 30/00 |
| DE | 102008037611 | 6/2010 | ............ | B29D 30/48 |
| EP | 2 328 745 | 5/2013 | ............ | B29D 30/08 |
| JP | 3-111336 | 5/1991 | ............ | B65G 59/10 |
| JP | 6-199422 | 7/1994 | ............ | B65G 59/10 |
| JP | 2003-175555 | 6/2003 | ............ | B29D 30/48 |
| JP | 2003-191346 | 7/2003 | ............ | B29D 30/08 |
| JP | 2005-238475 | 9/2005 | ............ | B29D 30/48 |
| JP | 2012-500139 | 1/2012 | ............ | B29D 30/48 |
| JP | 2016-108139 | 6/2016 | ............ | B65G 35/06 |
| WO | WO2007066394 | 6/2007 | ............ | B29D 30/32 |
| WO | WO 2010/021546 | 2/2010 | ............ | B29D 30/08 |
| WO | WO2010021546 | 2/2010 | ............ | B29D 30/08 |
| WO | WO 2014/097111 | 6/2014 | ............ | B29D 30/00 |

OTHER PUBLICATIONS

International Search Report and Written Opinion issued in PCT/NL2020/050224, dated Jun. 10, 2020, 10 pages.

International Preliminary Report on Patentability issued in PCT/NL2020/050224, dated Nov. 16, 2021, 6 pages.

Japanese Decision to Grant issued in related Japanese Application Serial No. 2020-538784, dated Feb. 25, 2022, 5 pages with translation.

Japanese Refusal issued in related Japanese Application Serial No. 2020-538784, dated Oct. 8, 2021, 9 pages with translation.

Chinese Official Action dated Aug. 15, 2022 issued in related Chinese Patent Application Serial No. 202010468538.0, with translation (25 pages).

\* cited by examiner

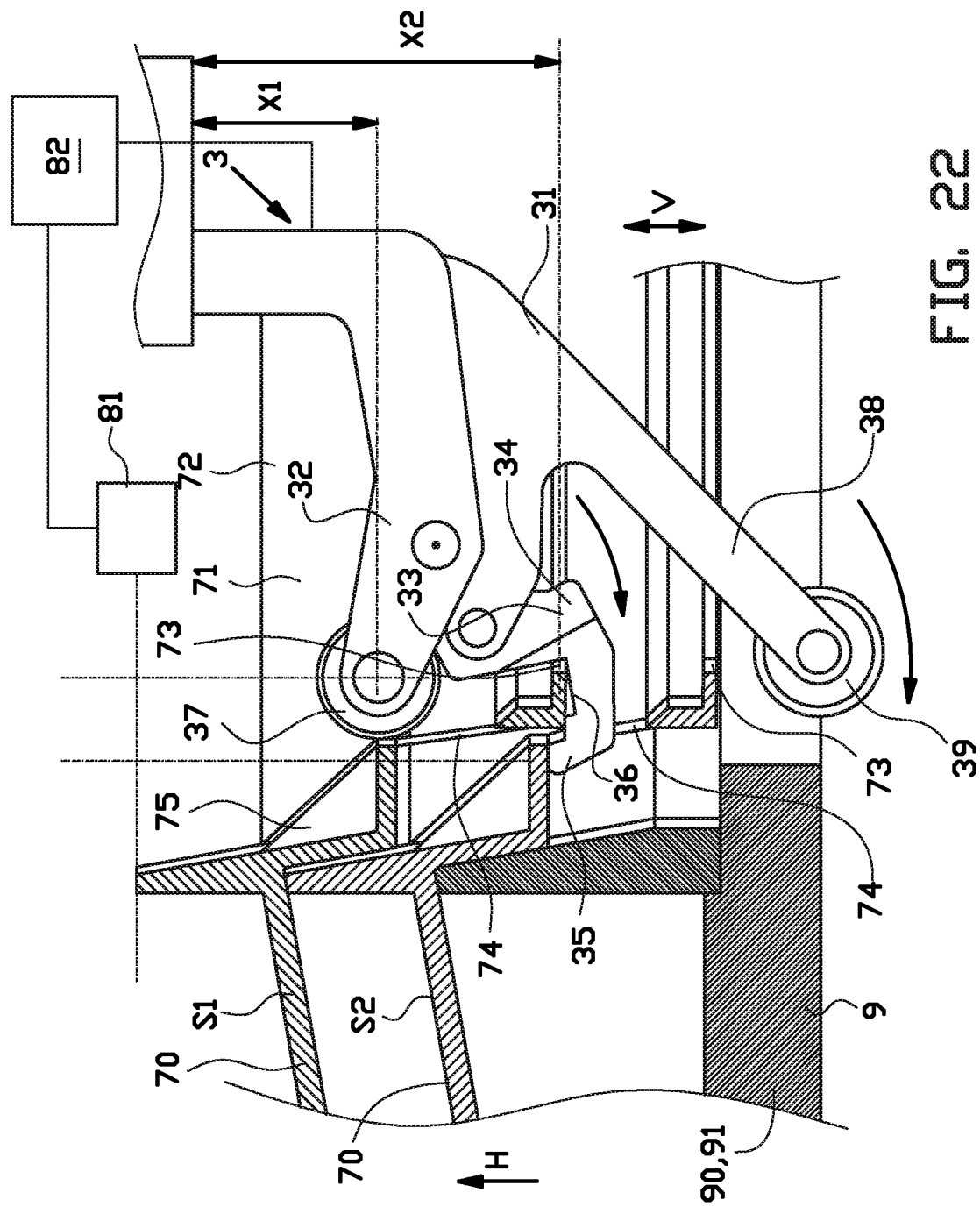

BEAD-APEX STORAGE SYSTEM AND METHOD FOR HANDLING A PLURALITY OF STACKS WITH BEAD-APEXES AND SPACERS

BACKGROUND

The invention relates to a bead-apex storage system and a method for handling a plurality of stacks with bead-apexes and spacers.

JP 2016-108139 A discloses a transfer facility with a plurality of carriages which are arranged in series along a transport direction. The carriages are alternately loaded with a plurality of bead members and a plurality of cartridges between the bead members to prevent adhesion. The carriages are interconnected in the transport direction by connection means. As such, the interconnected carriages can be pulled as a group by a first transport mechanism along a track to sequentially advance the first three carriages of the series through an unloading section, a cartridge recovery section and a connection release section, respectively. In the unloading section, the top cartridge with the bead member supported thereon are engaged by an unloading device. The engaged cartridge and bead member are then separated and the cartridge is collected on the carriage in the cartridge recovery section. Said carriage has become an empty carriage during a previous unloading cycle of the transfer facility. Once the carriage is filled with empty cartridges, it is advanced to the connection release section where the connection between the filled carriage and the series of interconnected carriages is terminated. Said disconnected carriage is then sidetracked by a second transport mechanism and returned by a third transport mechanism to be reused.

EP 2 328 745 B1 discloses a bead storage unit for vertically stacking a number of beads while placing spacers in between them. The bead storage unit comprises three conveyor belts for supplying, on each conveyor, stacks of beads. Each conveyor is arranged for supplying stacks of beads with different diameters. The device further comprises a movable robot arm arranged on a fixed base, that can reach from the fixed base to each of the three conveyors for transferring the beads of a specific diameter supported on any one of said conveyors to the bead loader. The stacks are loaded onto the conveyors by a mobile unit that is moved by an operator or automatically.

SUMMARY OF THE INVENTION

The sequential configuration of the known transfer facility of JP 2016-108139 A allows for a constant supply of beads of the same size. The known transfer facility therefore works well in combination with a traditional tire building machine that typically produces only one tire size over a relatively long period of time. However, in modern tire building, there is an increasing demand for higher flexibility. In particular, a tire building machine may switch more frequently between tire specifications, thus requiring a switch over to a different bead size during a continuous unloading process. The known transfer facility lacks flexibility to switch to another bead size during the unloading process.

EP 2 328 745 B1 solves this problem by providing three conveyors for three different bead diameters. The disadvantage of such a configuration is that each bead diameter requires its own supply line. Hence, when the flexibility needs to be increased to more than three bead diameters, i.e. six or more different bead diameters, the footprint, complexity and cost of the bead storage unit increase proportionally. Moreover, the range of the robot arm with respect to its fixed base is limited and the robot arm may not be able to reach every supply line.

It is an object of the present invention to provide a bead-apex storage system and a method for handling a plurality of stacks with bead-apexes and spacers, wherein the flexibility of the bead-apex storage system can be increased.

According to a first aspect, the invention provides a bead-apex storage system for handling a plurality of carriers, wherein each carrier is arranged to support a stack of bead-apexes stacked in a stacking direction and alternated with spacers separating the bead-apexes from each other in said stacking direction, wherein the bead-apex storage system comprises a plurality of storage stations for storing the carriers and a transfer station for transferring one of the plurality of bead-apexes to a tire building machine, wherein the bead-apex storage system further comprises a spacer gripper for lifting one or more of the spacers from one of the carriers in one of the plurality of storage stations and for carrying said one or more lifted spacers to the transfer station, wherein the bead-apex storage system comprises a spacer gripper base for supporting the spacer gripper, wherein the spacer gripper base is movable from the transfer station to any one of the plurality of storage stations.

The spacer gripper base is mobile and, as such, can visit any one of the plurality of the storage stations independently of the transfer of said bead-apexes to the tire building machine at the transfer station. Hence, the number of storage stations, in principle, is limitless and can thus hold more variations of bead-apex diameters to considerably increase the flexibility of the bead-apex storage system. The spacer gripper can selectively visit any of said storage stations at any time based on the demand of the tire building machine. Moreover, the spacer gripper can lift and carry one or more spacers with bead-apexes supported thereon from a stack in a respective one of the storage stations while the bead-apexes from one or more previously lifted spacers are being transferred to the tire building machine at the transfer station. Hence, the effect of the spacer gripper base travelling to and from the storage stations on the cycle time of the bead-apex storage system can be minimized. Furthermore, the range of movement of the spacer gripper relative to spacer gripper base can be minimized. The spacer gripper can therefore less complex and/or less costly.

In an preferred embodiment the bead-apex storage system further comprises a loading station for loading one of the carriers into the bead-apex storage system and a carrier gripper for engaging said one carrier in the loading station and for moving said one engaged carrier to any one of the plurality of storage stations. Hence, the loading of the carriers into the bead-apex storage system can be at least partially automated. Therefore, it is not necessary for an operator to enter the bead-apex storage system to move the carriers into their respective storage stations. Operator access can be limited to the loading station.

In a further embodiment thereof the carrier gripper is supported by the spacer gripper base, wherein said spacer gripper base is movable from the loading station and the transfer station to any one of the storage stations. Hence, the carrier gripper and the spacer gripper do not require separate bases to be moved to any one of the storage stations, thereby further reducing the complexity of the bead-apex storage system. Instead, they can be moved by the same common spacer gripper base. This has the additional advantage that the infrastructure of the bead-apex storage system only needs to take into account a single movement path of the common spacer gripper base.

In another preferred embodiment the plurality of storage stations are located in-line in a main direction. More in particular, the transfer station and the plurality of storage stations are located in-line in the main direction. In other words, the plurality of storage stations can be placed side-by-side in said main direction. Hence, each storage station can be individually accessible in a direction transverse or perpendicular to said main direction. Moreover, the spacer gripper base and/or the carrier gripper base can conveniently move in front of and/or along the plurality of storage stations to visit any one of said storage stations.

Preferably, the spacer gripper base is movable in the main direction. Hence, the spacer gripper base can move in parallel to the plurality of storage stations, i.e. parallel to the direction in which the plurality of storage stations are placed in-line or side-by-side. Moreover, the distance between the spacer gripper base and the plurality of storage stations in a direction transverse or perpendicular to the main direction can also be kept constant.

In a preferred embodiment the bead-apex storage system comprises one or more guides extending in the main direction, wherein the spacer gripper base is movable along at least one of the one or more guides. The one or more rails can reliably facilitate accurate movement of the spacer gripper base along and/or relative to the plurality of storage stations.

In an alternative embodiment the bead-apex storage system comprises a carrier gripper base for supporting the carrier gripper, wherein the spacer gripper base and the carrier gripper base are independently movable from the transfer station to any one of the storage stations and from the loading station to any one of the storage stations, respectively. The carrier gripper can load and unload carriers to and from the plurality of storage stations while the spacer gripper can independently and/or simultaneously lift and carry one or more spacers from a stack in a respective one of the storage stations to the transfer station. Hence, the productivity of the bead-apex storage system can be increased.

In a preferred embodiment thereof the plurality of storage stations are located in-line in a main direction, wherein the spacer gripper base is movable from the transfer station to any one of the storage stations at a first side of the plurality of storage stations and the carrier gripper base is movable from the loading station to any one of the storage stations at a second side of the plurality of storage stations opposite to the first side. Hence, interference between the movements of the spacer gripper base and the carrier gripper base can be prevented.

In a further embodiment thereof the carrier gripper base is movable in the main direction. Hence, the carrier gripper base can move in parallel to the plurality of storage stations, i.e. parallel to the direction in which the plurality of storage stations are placed in-line or side-by-side. Moreover, the distance between the carrier gripper base and the plurality of storage stations in a direction transverse or perpendicular to the main direction can also be kept constant.

In a further embodiment the plurality of storage stations are located in-line in a main direction, wherein the carrier gripper is movable in a storage direction transverse or perpendicular to the main direction for loading and unloading a respective one of the carriers into and from a respective one of the plurality of storage stations. The carrier gripper can thus engage and carry one of the carriers in a position alongside or in front of the plurality of storage stations for transporting said one carrier to any one of the plurality of storage positions without colliding with the other carriers in said plurality of storage positions. When the carrier gripper is positioned in front of the storage station to be loaded, the carrier gripper with the one carrier supported thereon can be moved in the storage direction branching of from said main direction, to position the one carrier in the storage station to be loaded.

Based on the previous embodiment, it is preferred that each storage station comprises a support for a respective one of the carriers, wherein the carrier gripper is movable into and retractable out of the each storage station in the storage direction at a lifting level above the support and a releasing level below the respective support, wherein the carrier gripper is further movable in a height direction perpendicular to the main direction and the storage direction through the respective support between the lifting level and the releasing level. When loading a carrier into a respective one of the storage stations, the carrier gripper can be moved into the storage station at the lifting level into a position above the support. Subsequently, the carrier gripper can be lowered from the lifting level towards the releasing level below the support, placing the carrier onto the support in the process. The carrier gripper then drops away from underneath the carrier to the releasing level to move out of the respective storage station. When unloading a carrier from the respective storage station, the steps above are carried out in the reverse order.

In a further embodiment the plurality of carriers are pallets, wherein the carrier gripper comprises a fork to engage and carry one of said pallets. The forks can reliably engage and carry one of said pallets. Moreover, the forks can be engaged with said one pallet in the main direction in the loading station while they can also drop away from the pallet when moving from the lifting level to the releasing level in one of the storage stations.

In another embodiment each spacer has a central aperture, wherein the central apertures of the spacers in a respective one of the stacks of bead-apexes are aligned in the stacking direction to form a central space, wherein the spacer gripper comprises a gripper head and a plurality of spacer engagement members protruding from said gripper head for reaching into the central space of the respective stack to engage one of the spacers in said respective stack. The spacers can thus be engaged from inside said central space.

In a first embodiment thereof the plurality of spacer engagement members are arranged to reach into the central space of the respective stack at least up to a second spacer of the respective stack from the top of the respective stack, wherein the plurality of spacer engagement members are movable into an engagement position for engaging said second spacer to lift said second spacer from the respective stack simultaneously with the spacer at the top of the respective stack. The tire building machine typically requires two bead-apexes of the same size. The conventional robot arms of the prior art have been arranged to engage one spacer at a time. Hence, the known robot arm has to travel to the storage station twice to deliver two bead-apexes to the tire building machine. The spacer gripper according to the present invention has to travel a relatively long distance between the storage stations and the transfer station, depending on which storage station is to be visited. Thus, it makes sense to lift and carry two spacers with bead-apexes supported thereon to the transfer station simultaneously, thereby saving valuable time.

In a second embodiment thereof each spacer engagement member comprises a first element at a first distance from the gripper head for contacting a first spacer at the top of the respective stack and a second element at a second distance from the gripper head, greater than the first distance, to engage the second spacer from the top of the respective stack. The first element can align the first spacer at the top of the stack relative to the second spacer and/or the stack as a whole while the second element engages the second spacer from the top of the stack.

In a third embodiment thereof the bead-apex storage system comprises a detector for detecting the position of the plurality of spacer engagement members in the stacking direction relative to the spacers in the respective stack and a control unit that is operationally connected to the detector and the spacer gripper and programmed for controlling the plurality of spacer engagement members to engage a second spacer from the top of the respective stack when the plurality of spacer engagement members are positioned in the stacking direction at said second spacer from the top of the respective stack. The spacer gripper can thus be accurately controlled based on the detector to engage the second spacer from the top of the stack. The simultaneous lifting of the two spacers from the top of the stack can thus be automated.

In a fourth embodiment thereof, each spacer engagement member comprises a centering roller insertable into the central space of the stack for centering one or more spacers and/or the stack as a whole with respect to the spacer gripper. Hence, when the stack is slightly offset or inclined with respect to spacer gripper, the centering roller may center the stack as a whole relative to the spacer gripper, to improve the alignment during the picking up of spacers from said stack.

Note that the four aforementioned embodiments of spacer gripper can be applied individually from the bead-apex storage system. In particular, the feature that the spacer gripper can engage the second spacer from the top of a respective stack and lift two spacers simultaneously and/or the feature that the spacers or the stack as a whole is centered by a centering roller can also be applied to conventional bead-apex handling systems. Hence, the spacer gripper as such, including its features as described in the description and as shown in the drawings, can be made subject of divisional patent applications.

In another embodiment the spacer gripper is arranged for releasing the one or more lifted spacers in the transfer station, wherein the bead-apex storage system further comprises a transfer unit for transferring one or more bead-apexes from the released one or more spacers in the transfer station to the tire building machine. Consequently, the spacer gripper does not transfer the bead-apexes supported on the one or more lifted spacers directly to the tire building machine. Instead, it supplies the one or more lifted spacers to the transfer station, from where the transfer unit transfers the one or more bead-apexes supported on said one or more lifted spacers to the tire building machine.

Preferably, the transfer unit comprises a manipulator for engaging and carrying the one or more bead-apexes from the transfer station to the tire building machine and a manipulator base for supporting said manipulator, wherein the manipulator base is fixed relative to the transfer station. The manipulator can be moved accurately and/or with relatively small tolerances with respect to the manipulator base to accurately transfer the bead-apexes to the tire building machine. Hence, the accuracy of the spacer gripper is less important. In other words, the spacer gripper can be relatively inaccurate.

More preferably, the manipulator comprises a robotic arm and a bead-apex gripper supported by said robotic arm. The robotic arm can have several degrees of freedom to accurately position the bead-apex gripper relative to the one or more released spacers in the transfer station and/or the tire building machine. In particular, the robotic arm has more than three degrees of freedom, preferably six degrees of freedom.

In a further embodiment the transfer station comprises a platform with a first section for receiving the one or more released spacers from the spacer gripper and a second section for receiving one or more of the released spacers that are empty when the transfer unit has transferred the respective bead-apexes supported thereon to the tire building machine. By having a platform with two sections, empty spacers can be moved from the first section to the second section to expose any spacer underneath the empty spacer in the first section. This is particularly advantageous in the previously discussed embodiment in which the spacer gripper supplies two spacers with bead-apexes supported thereon simultaneously to the transfer station. In that case, the first spacer can be lifted from the second spacer underneath to access the bead-apex on said second spacer.

Preferably, each carrier comprises a carrier base and a spacer member integrated with or fixedly connected to said carrier base, wherein the spacer gripper is arranged to engage and carry the respective carrier by engaging and carrying the spacer member thereof, wherein the first section is arranged to receive a respective one of said carriers. More preferably, each carrier comprises a plurality of wheels connected to the carrier base at a side of the carrier base facing away from the spacer member, wherein the platform at the first section comprises a support surface and recesses in said support surface for accommodating said plurality of wheels below the support surface. By having the spacer member on the carrier base, the carrier base can also carry a bead-apex which can be unloaded by placing the carrier with the bead-apex supported thereon at the first section. The emptied carrier can subsequently be repurposed to collect empty spacers.

In a further embodiment thereof, the bead-apex storage system further comprises one or more buffer stations for holding carriers, wherein the transfer unit is arranged for transferring a carrier between a respective one of the buffer stations and the first section of the platform, wherein the spacer gripper is arranged to engage the transferred carrier at the first section. The buffer stations can hold one or more empty carriers that can be reintroduced into the bead-apex storage system, i.e. to collect empty spacers, by transferring one of said empty carriers via the first section to any one of the storage stations or a dedicated spacer collection station.

In another embodiment the spacer gripper is movable with respect to the spacer gripper base in a height direction. In this way, the spacer gripper can be positioned just above the stack in a respective one of the storage stations, depending on the stack height, to engage the next one or more spacers of said stack.

Preferably, the transfer station comprises a platform for receiving the one or more released spacers from the spacer gripper, wherein said platform is raised with respect to the plurality of storage stations, wherein the spacer gripper is movable in the height direction up to a transfer level above the platform. The platform may be raised to allow a transfer unit and/or the tire building machine to interact with the bead-apex storage system at said raised level. The spacer gripper should be able to reach at least up to said raised level to release the one or more lifted spacers in the transfer station.

In another embodiment the spacer gripper is movable in three degrees of freedom or less. Hence, the spacer gripper can be considerably less complex and/or less costly than a conventional robotic arm.

In another embodiment the plurality of storage stations comprises at least four storage stations, preferably at least six storage stations and most preferably at least eight storage stations. The higher the number of storage stations, the greater the flexibility of the bead-apex storage system.

In another embodiment the bead-apex storage system further comprises at least one spacer collection station for collecting stacks of empty spacers. Preferably, said at least one spacer collection station is located between the transfer station and the storage station of the plurality of storage stations closest to said transfer station. The spacer collection station can be used to collect spacers emptied in the transfer station. By placing the spacer collection station as close as possible to the transfer station, the empty spacers can be transferred to the spacer collection station relatively quickly. This is particularly advantageous when the spacer gripper is used for this purpose.

According to a second aspect, the invention provides a method for handling a plurality of carriers with a bead-apex storage system according to any one of the aforementioned embodiments, wherein the method comprises the step of:
  using the spacer gripper to lift one or more of the spacers from one of the carriers in a respective one of the plurality of storage stations and to carry said one or more lifted spacers to the transfer station.

The method relates to the practical implementation of bead-apex storage system during the steps of handling the plurality of carriers. The method and its embodiment thus have substantially the same technical advantages as the bead-apex storage system according to the first aspect to the invention.

In a preferred embodiment the method further comprises the steps of:
  releasing the one or more lifted spacers from the spacer gripper in the transfer station; and
  transferring one or more of the plurality of bead-apexes from the one or more released spacers in the transfer station to the tire building machine.

In a further embodiment thereof the method further comprises the step of:
  using the spacer gripper to engage a further one or more of the spacers from one of the carriers in a respective one of the plurality of storage stations and to carry said one or more lifted spacers to the transfer station while the step of transferring of the one or more of the plurality of bead-apexes from the previously released one or more spacers in the transfer station to the tire building machine is taking place.

In another embodiment of the method the spacer gripper simultaneously lifts two of the spacers from one of the carriers in a respective one of the plurality of storage stations, wherein the method further comprises the steps of:
  releasing the two simultaneously lifted spacers from the spacer gripper in the transfer station with a first spacer of the two simultaneously lifted spacers in an upper position and a second spacer of the two simultaneously lifted spacers in a lower position;
  separating a respective one of the bead-apexes from the first spacer and placing the first spacer at a side of the second spacer; and
  separating a respective one of the bead-apexes from the second spacer and placing the second spacer on top of the first spacer.

In a further embodiment thereof the bead-apex storage system further comprises at least one spacer collection station for collecting stacks of empty spacers, wherein the method further comprises the step of:
  using the spacer gripper to collect the first spacer and the second spacer from the transfer station and to move said first spacer and said second spacer to the spacer collection station.

Preferably, the method comprises the step of placing an empty carrier in said at least one spacer collection station for supporting the stack of empty spacers.

In a further embodiment the bead-apex storage system further comprises a loading station and a carrier gripper, wherein the method further comprises the steps of:
  receiving a carrier in the loading station;
  using the carrier gripper to engage the carrier in the loading station and to move the engaged carrier to any one of the plurality of storage stations.

In a further embodiment thereof the method further comprises the step of:
  using the carrier gripper to engage a stack of empty spacers in a spacer collection station and to carry said engaged stack of empty spacers to the loading station.

In a further embodiment of the method the transfer station comprises a platform with a first section for receiving the one or more released spacers from the spacer gripper and a second section for receiving one or more of the released spacers that are empty when the respective bead-apexes supported thereon are transferred to the tire building machine, wherein the first section is further arranged to receive a respective one of the carriers, wherein the bead-apex storage system further comprises one or more buffer stations for holding carriers, wherein the method further comprises the steps of:
  transferring one of the carriers between a respective one of the buffer stations and the first section of the platform; and
  using the spacer gripper to engage the transferred carrier at the first section.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIGS. 21 and 22 show the cross section plane of the spacer gripper according to FIG. 20 during two steps of simultaneously lifting two spacers.

DETAILED DESCRIPTION OF THE INVENTION

Figure 1:
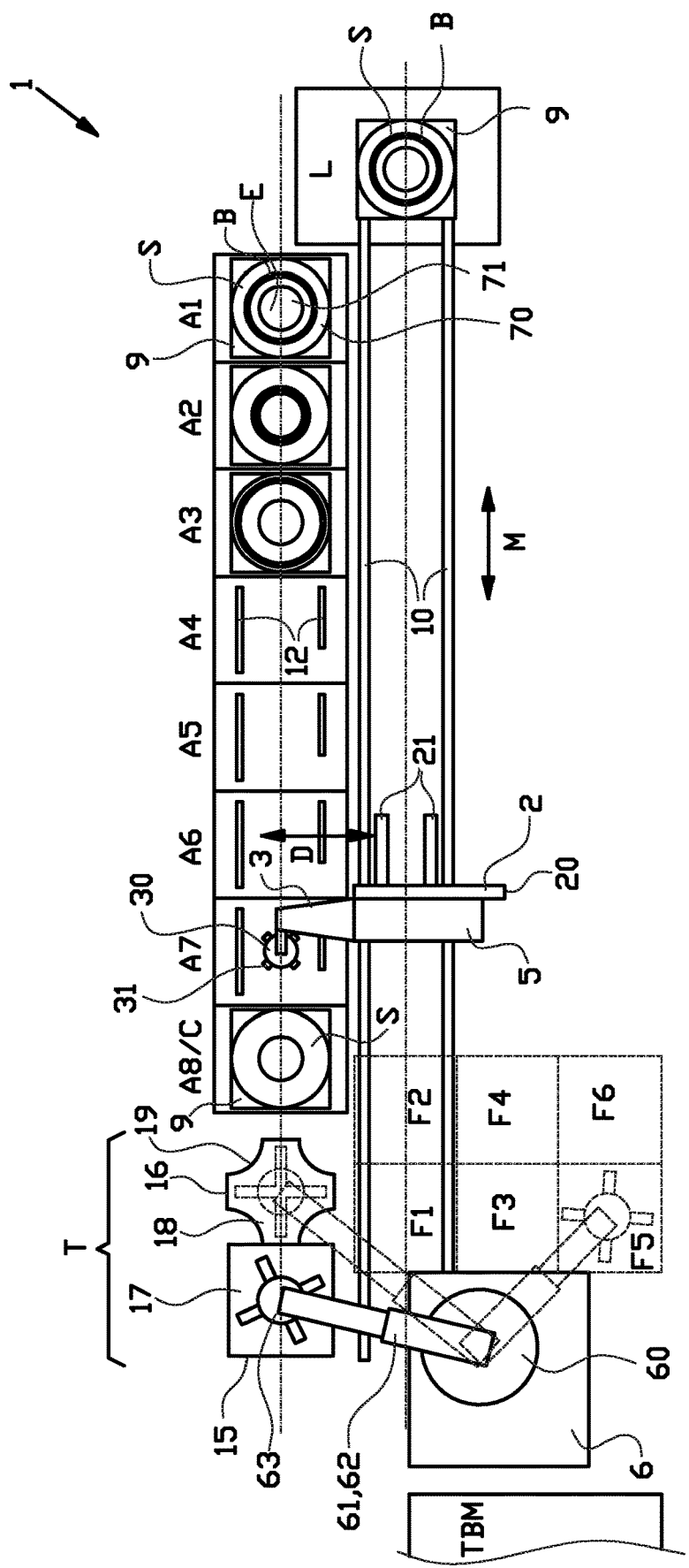
FIG. 1 shows a top view of a bead-apex storage system according to a first embodiment of the invention.
Figure 2:
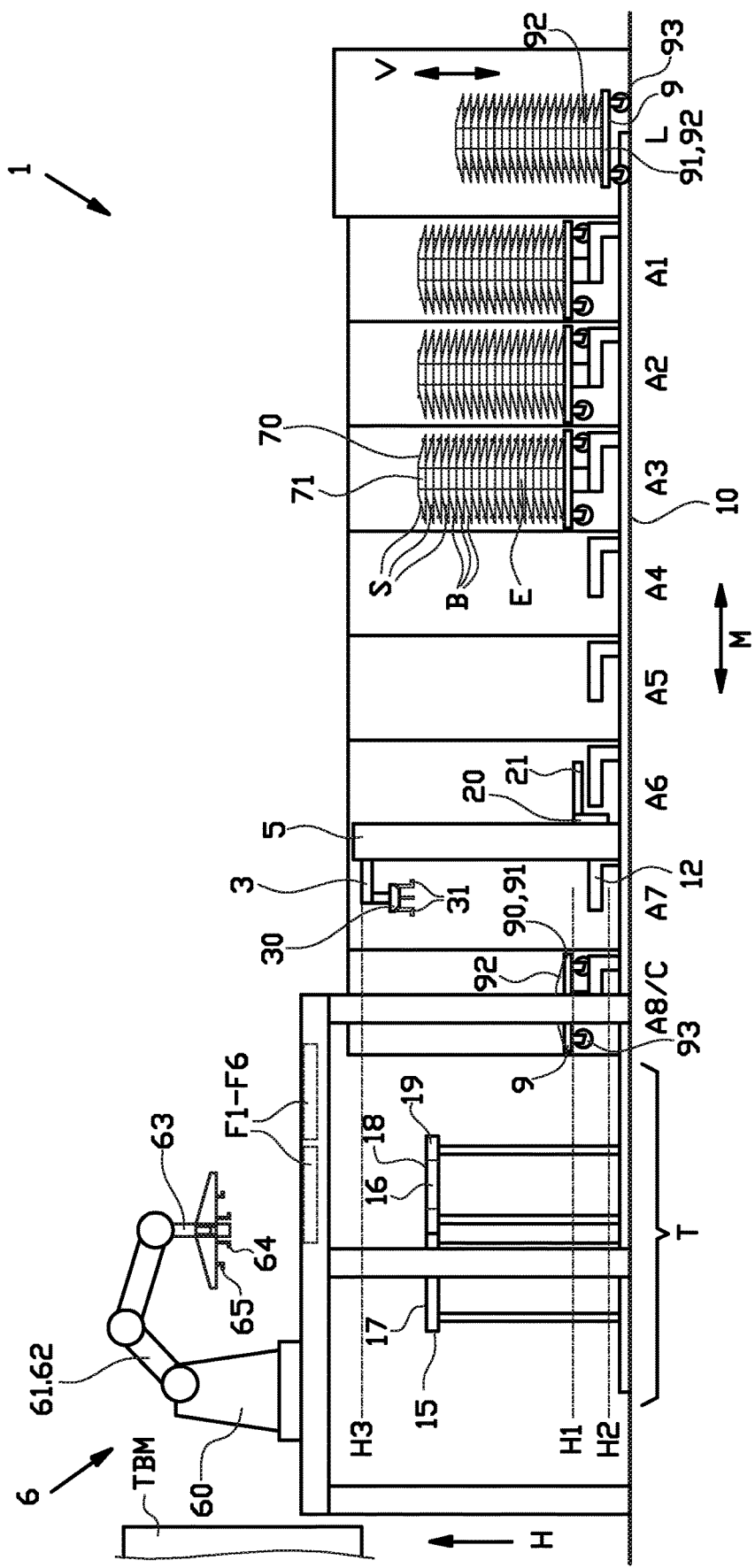
FIG. 2 shows a side view of the bead-apex storage system according to FIG. 1.

FIGS. 1 and 2 show a bead-apex storage system 1 for handling a plurality of carriers 9 according to an exemplary first embodiment of the invention. Each carrier 9 is arranged to support a stack of bead-apexes B stacked in a stacking direction V and alternated with spacers S separating the bead-apexes B from each other in said stacking direction V. In this exemplary embodiment, the bead-apexes B are supported on the spacers S in the stacking direction V. Said stacking direction V is preferably vertical or substantially vertical. The bead-apex storage system 1 is located upstream of a tire building machine TBM in a production line for manufacturing tires. The TBM requires a flexible supply of bead-apexes B, i.e. a supply of bead-apexes B that can be easily switched between specifications, material, shape, size and/or diameter.

In this exemplary embodiment, the carriers 9 each comprise a base 91, in particular a pallet 90, that can be engaged and carried through the bead-apex storage system 1 in a manner that will be described in more detail hereafter. On the base 91, the carrier 9 is provided with a spacer member 92 integrated with or fixedly connected to said carrier base 91. The carrier 9 comprises or is placed on wheels 93 so that it can be rolled over a factory floor, i.e. for manual loading of the carrier 9 into bead-apex storage system 1. Preferably, the wheels 93 are connected to the carrier base 91 at a side of the carrier base 91 facing away from the spacer member 92.

As best seen in FIG. 2, each spacer S comprises a spacer body 70 with a central aperture 71. The spacer body 70 forms a conical support surface for one of the bead-apexes B extending in a circumferential direction around said central aperture 71. The central apertures 71 of the spacers S in in a respective one of the stacks of bead-apexes B are aligned in the stacking direction V to form a central space E. The spacer member 92 at the base 91 of the carrier 9 has substantially the same shape as the spacers S stacked on top of said carrier 9. Hence, the spacer member 92 at the base 91 of the carrier 9 can effectively function as a first spacer S to support a first one of the bead-apexes B. The rest of the spacers S can be stacked on top of the spacer member 92, each spacer S supporting its own bead-apex B.

The bead-apex storage system 1 comprises a plurality of storage stations A1-A8 for storing the carriers 9. In this exemplary embodiment, the bead-apex storage system 1 has eight storage stations A1-A8. It will however be apparent that the number of storage stations may differ. The bead-apex storage system 1 further comprises a loading station L for loading one of the carriers 9 into the bead-apex storage system 1, 101 and a transfer station T for transferring one of the plurality of bead-apexes B out of the bead-apex storage system 1 to the tire building machine TBM. The plurality of storage stations A1-A8 are located in-line or in series in a main direction M. Preferably, the transfer station T is also location in-line or in series with the plurality of storage stations A1-A8 in said main direction M.

The bead-apex storage system 1 further comprises a carrier gripper 2 for handling the carriers 9, a spacer gripper 3 for handling individual spacers S or a set of two spacers S and a transfer unit 6 for handling individual bead-apexes B. Each of the aforementioned parts of the bead-apex storage system 1 will be described hereafter in more detail.

Figure 3:
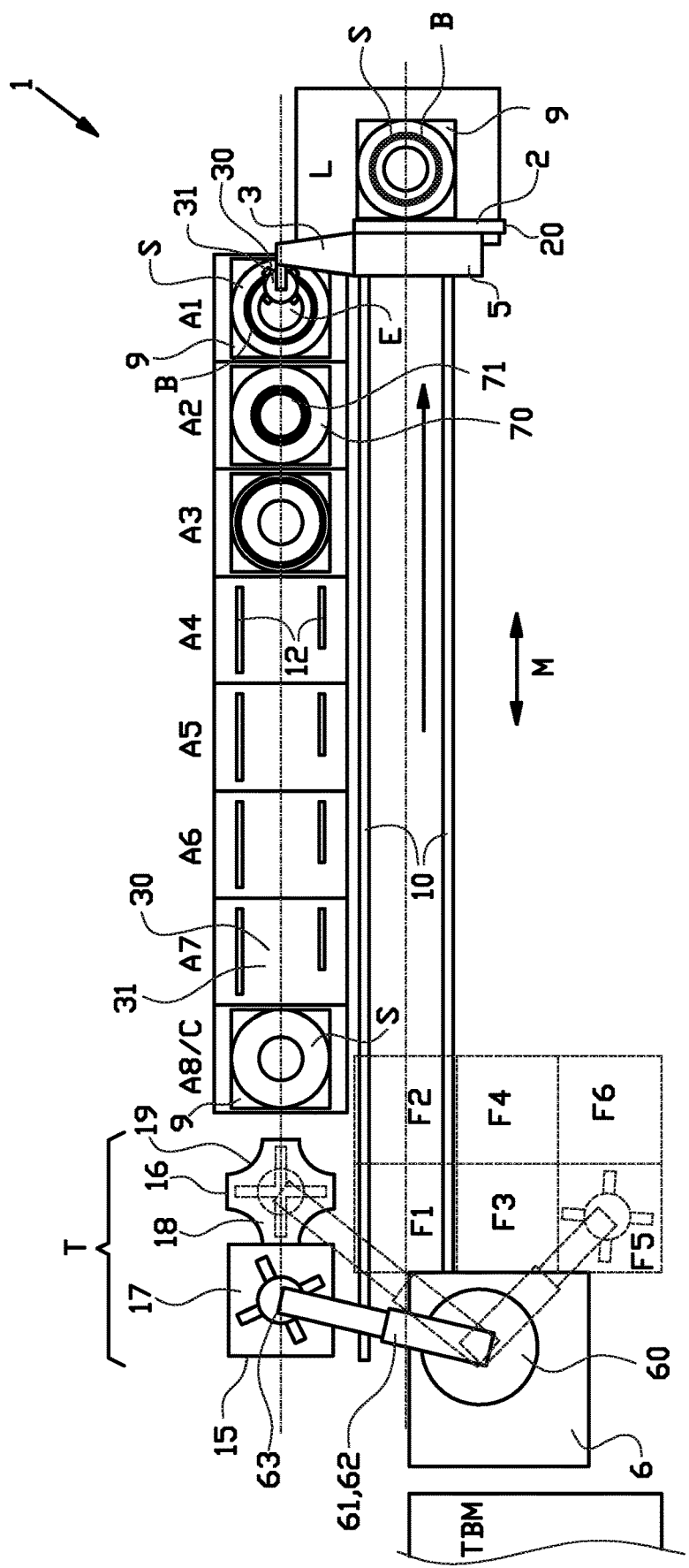
FIGS. 3-6 show top views of the bead-apex storage system according to FIG. 1 during steps of a method for handling a plurality of carriers.
Figure 4:
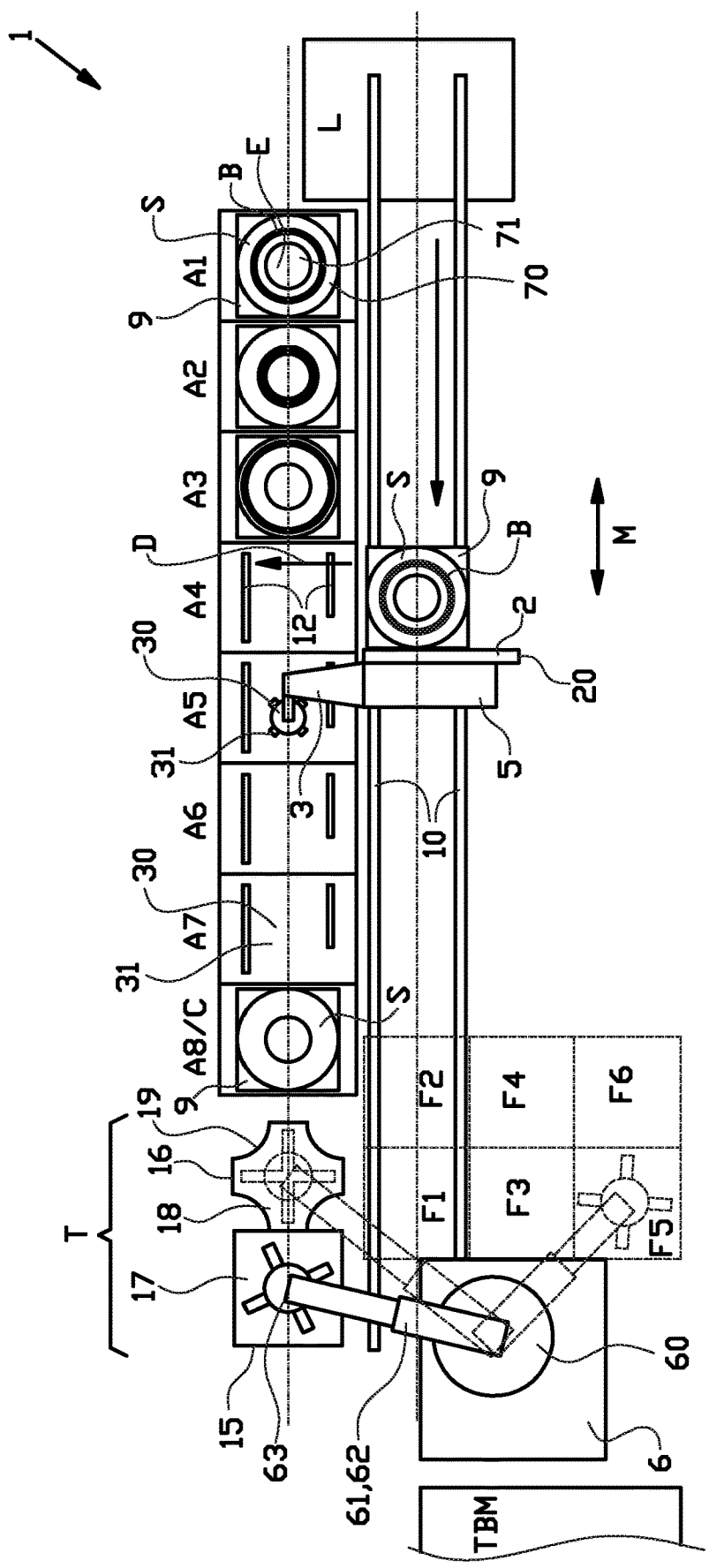
Figure 5:
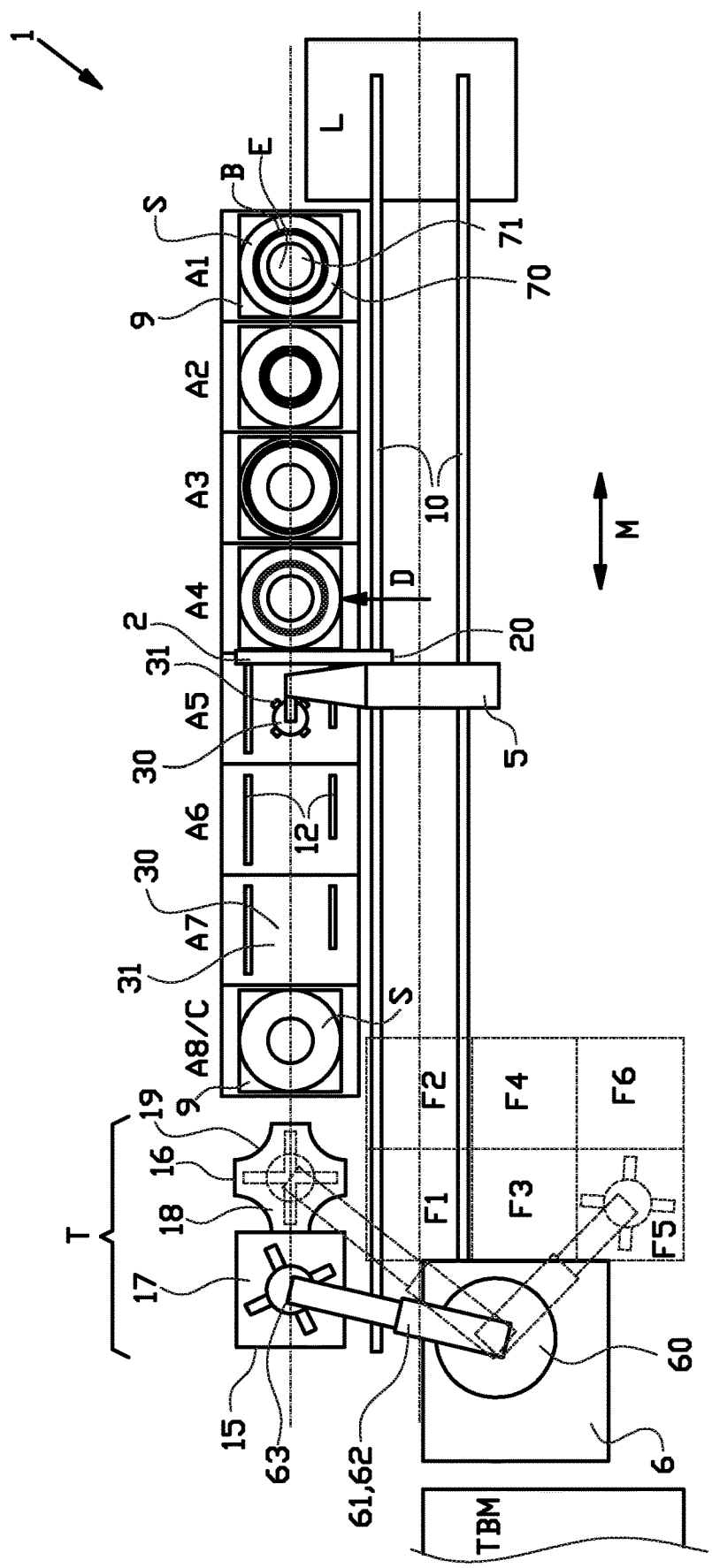

The carrier gripper 2 is arranged for engaging said one carrier 9 in the loading station L, as shown in FIGS. 1 and 3, and for moving said one engaged carrier 9 to any one of the plurality of storage stations A1-A8, as shown in FIGS. 4 and 5. The carrier gripper 2 is movable in the main direction M along the plurality of storage stations A1-A8. In this exemplary embodiment, the carrier gripper 2 comprises a fork 21 to engage the base 91, in particular the pallet 90, of one of the carriers 9, and a fork mount 20 to support and move the fork 21 relative to a base 5 for the carrier gripper 2.

Figure 7:
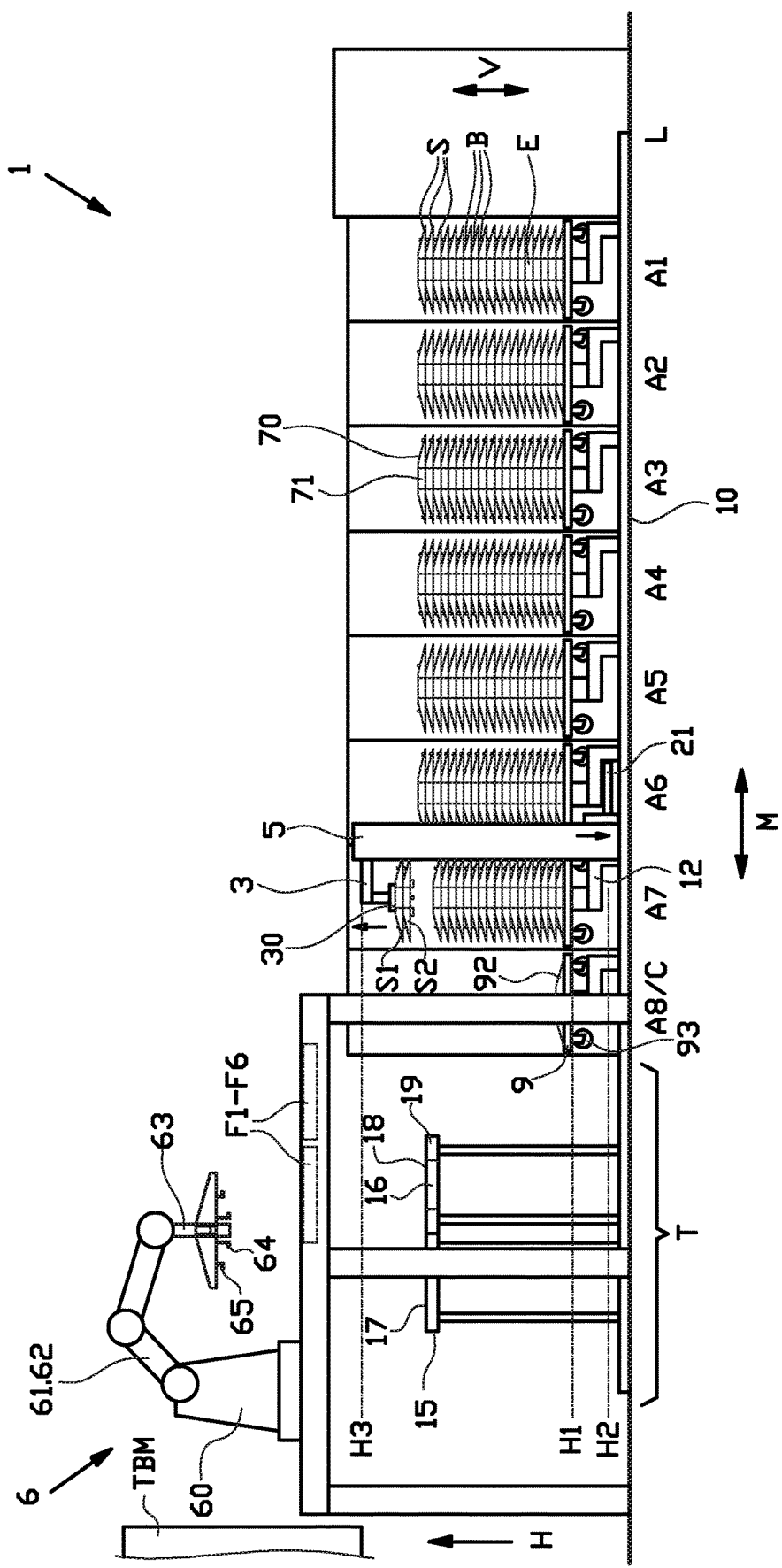
FIGS. 7-18 show side views of the bead-apex storage system according to FIG. 2 during further steps of the method for handling the plurality of carriers.
Figure 8:
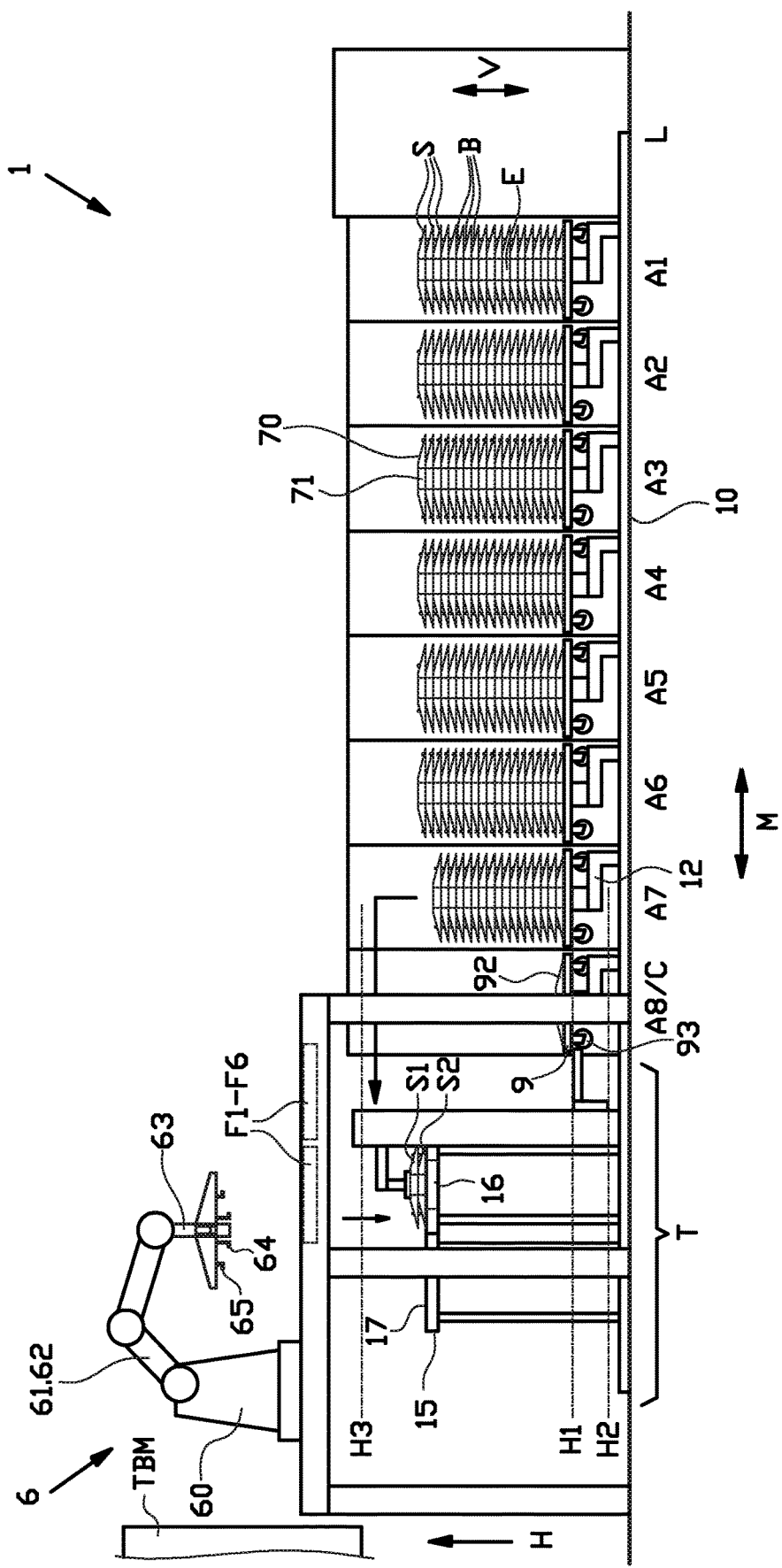

The spacer gripper 3 comprises a gripper head 30 and a plurality of spacer engagement members 31 protruding from said gripper head 30. The spacer engagement members 31 are arranged for reaching into the central space E of the respective stack to engage, lift and/or carry one of the spacers S from said respective stack. As shown in FIG. 7, the spacer engagement members 31 are arranged to engage the second spacer S2 from the top of the stack, thereby simultaneously lifting said second spacer S2 and the first spacer S1 at the top of the stack from said stack. This is convenient because the tire building machine TBM typically requires two bead-apexes B of the same specification for each tire building cycle. Like the carrier gripper 2, the spacer gripper 3 is movable in the main direction M along the plurality of storage stations A1-A8 and the transfer station T. As shown in FIG. 8, the spacer gripper 3 is arranged to place and/or release the one or more lifted spacers S1, S2 in the transfer station T for subsequent transfer by the transfer unit 6 to the tire building machine TBM. The spacer gripper 3 is further movable in a height direction H perpendicular to the main direction M and/or parallel to the stacking direction V to follow the decrease of the stack height as the spacers S are being lifted from the stack. Preferably, the spacer gripper 3 is movable in three degrees of freedom or less, in this case in only two degrees of freedom.

Once a stack is depleted and only the carrier 9 remains in one of the storage stations A1-A8, the spacer gripper 3 may engage, lift and/or carry said one carrier 9 by engaging the spacer member 92 thereof in substantially the same way as any of the spacers S. This is particularly convenient when said spacer member 92 also supports a bead-apex B that has to be transferred to the transfer station T, or when the empty carrier 9 is to be unloaded from the bead-apex storage system 1 or to be temporarily stored in a buffer position F1-F6 of the bead-apex storage system 1.

As shown in FIGS. 1 and 2, the bead-apex storage system 1 further comprises a spacer gripper base 5, for supporting the spacer gripper 3, i.e. relative to the factory floor. Said spacer gripper base 5 is movable from the transfer station T to any one of the plurality of storage stations A1-A8 and from the loading station L to any one of the plurality of storage stations A1-A8. In this exemplary embodiment the carrier gripper 2 is supported by the same spacer gripper base 5. In other words, the spacer gripper base 5 is a common gripper base for both the carrier gripper 2 and the spacer gripper 3. Hence, both the carrier gripper 2 and the spacer gripper 3 can be moved together to any one of the storage stations A1-A8. The spacer gripper 3 is movable relative to the spacer gripper base 5 in the height direction H. Preferably, the spacer gripper 3 projects from the spacer gripper base 5 in a storage direction D perpendicular to the main direction D into a position in which the gripper head 30 is located above or in-line with the carriers 9. Hence, the gripper head 30 does not need to be moved into and out of each storage station A1-A8 to engage the one or more spacers S in the stacks.

In this particular embodiment, the bead-apex storage system 1 comprises one or more guides 10 extending in the main direction M. In this example, the one or more guides 10 are one or more rails. The one or more guides 10 may be arranged on the factory floor or at an elevated level, i.e. overhead. Alternatively, the one or more guides 10 may be arranged at a side of the path travelled by the grippers 2, 3. The spacer gripper base 5 is movable along at least one of the one or more guides 10. Hence, the spacer gripper base 5 can be moved parallel to the direction in which the plurality of storage stations A1-A8 are placed side-by-side. It is noted that the spacer gripper base 5 may alternatively be an autonomous vehicle that is electronically guided along a linear guide path parallel to the main direction M. In that case, not physical guides are required.

As shown in FIGS. 4 and 5, the carrier gripper 2 is movable relative to the spacer gripper base 5 in the storage direction D into and out of each one of the storage stations A1-A8. As further shown in FIGS. 2 and 7, the carrier gripper 2 is movable in the height direction H perpendicular to the main direction M and the storage direction D between a lifting level H1 and a releasing level H2. As best seen in FIG. 2, each storage station A1-A8 comprises a support 12 for a respective one of the carriers 9. The carrier gripper 2 is movable into and retractable out of the each storage station A1-A8 in the storage direction D at the lifting level H1 above the support 12 and the releasing level H2 below the respective support 12. When loading one of the carriers 9 into one of the storage stations A1-A8, the carrier gripper 2 is raised to the lifting level H1 to carry the carrier 9 over the support 12 of said one storage station A1-A8. Subsequently, the carrier gripper 2 is lowered to the releasing level, as shown in FIG. 7, to drop through the support 12 to a level below said support 12. This releases the carrier 9 from the carrier gripper 2 and allows the carrier gripper 2 to move out of the storage station A1-A8 in the storage direction D. For unloading one of the carriers 9 from one of the storage stations A1-A8, the above steps can be performed in reverse order.

Note that the loading station L may be used for unloading the empty carriers 9 out of the bead-apex storage system 1. Alternatively, a separate unloading station may be provided, i.e. at the position between the loading station L and the first of the storage stations A1, so that the unloading does not interfere with the placement of a new carrier 9 in the loading station L.

As shown in FIGS. 1 and 2, the transfer station T comprises a platform 15 with a first section 16 and a second section 17. The first section 16 and the second section 17 each form a support surface 18 for supporting one or more spacers S. In particular, the first section 16 is arranged for receiving the one or more released spacers S1, S2 from the spacer gripper 3. The first section may also receive a carrier 9, for example when a stack is depleted and the carrier 9, together with the spacer member 92 and the bead-apex B supported thereon, is lifted and carried by the spacer gripper 3 to the transfer station T. As best seen in FIG. 1, the first section 16 is provided with recesses 19 in the support surface 18 for accommodating said plurality of wheels 93 below the support surface 18. The platform 15 is raised, i.e. like a table, with respect to the plurality of storage stations A1-A8. I.e. the platform 15 is located at a height that is offset in the height direction H with respect to the supports 12 of the storage stations A1-A8. Hence, the platform 15 can be easily reached by the transfer unit 6 which is placed above or overhead said platform 15. Consequently, the spacer gripper is movable in the height direction H up to a transfer level H3 above the platform 15 for depositing the spacers S on said platform 15.

Figure 9:
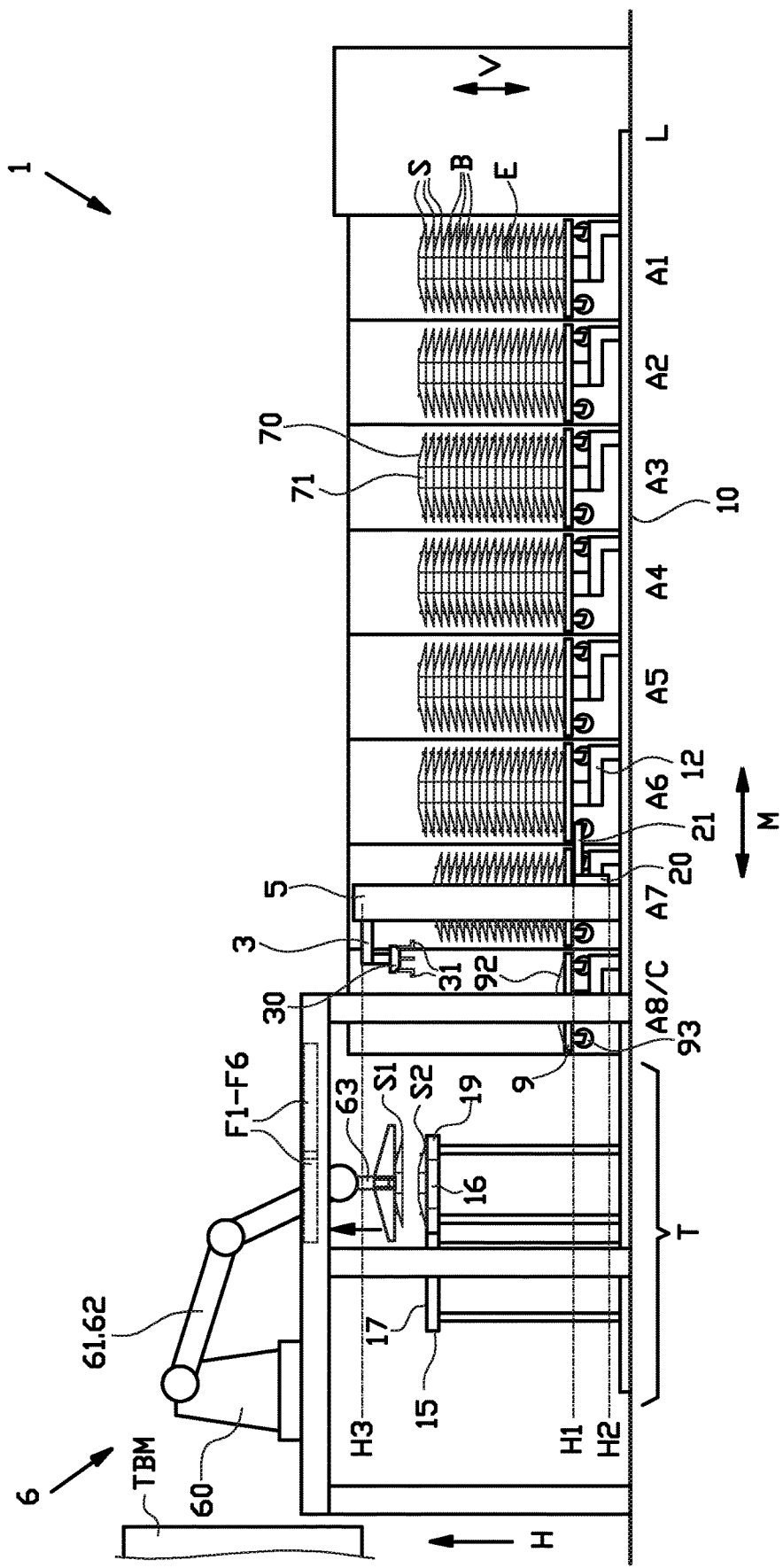
Figure 10:
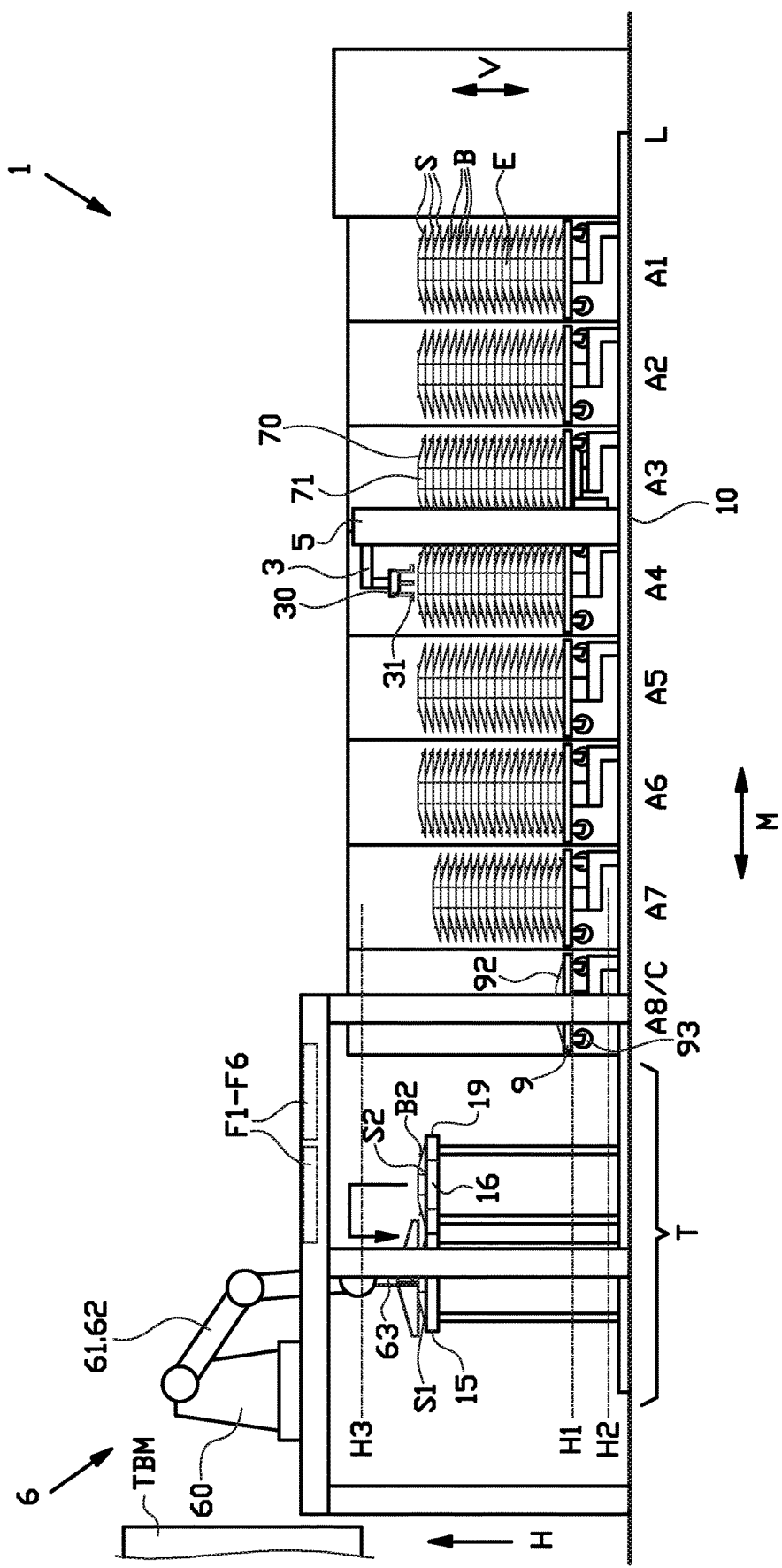
Figure 11:
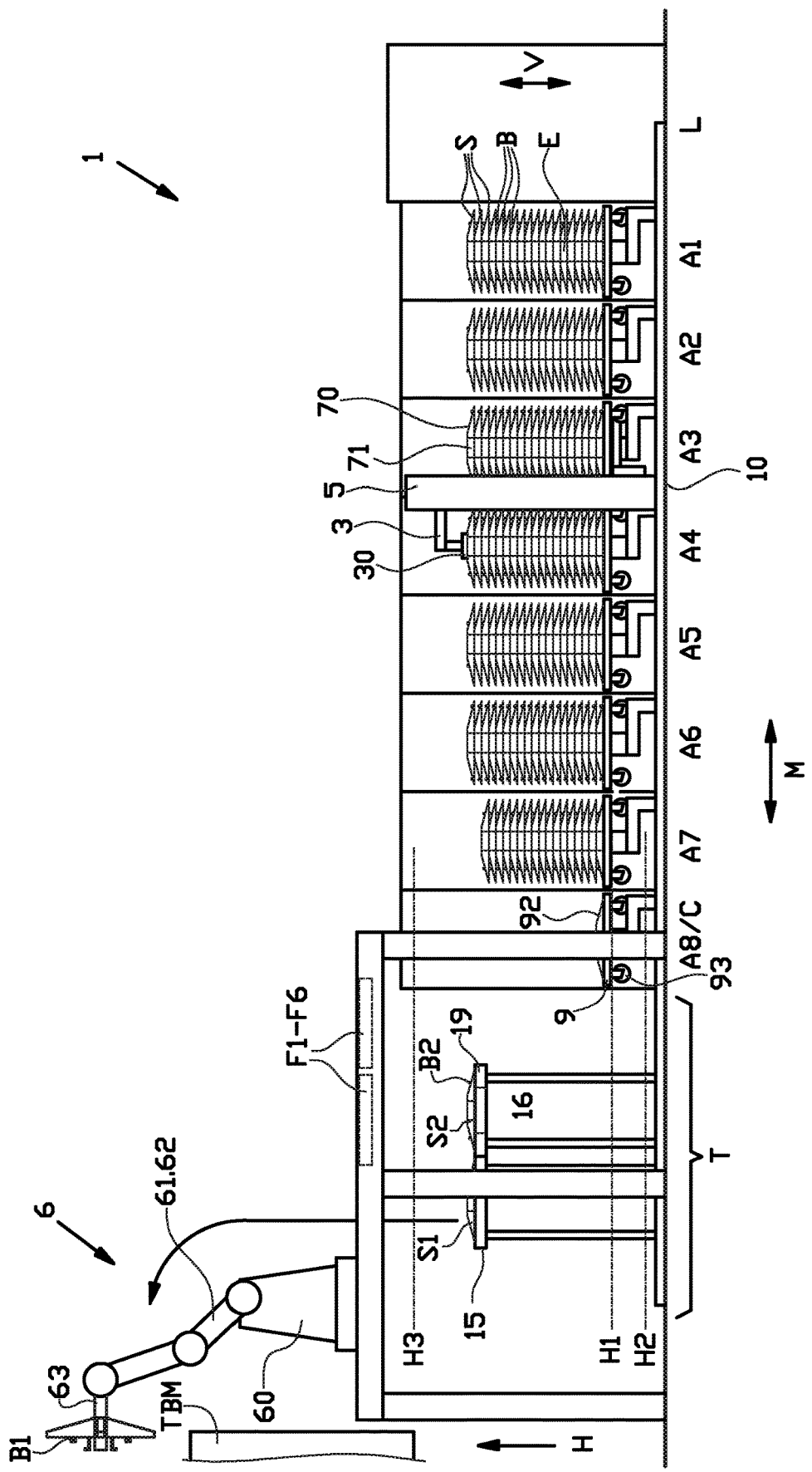

The transfer unit 6 is arranged for engaging one of the bead-apexes B supported on one of the one or more spacers S1, S2 in the first section 16 and for transferring said engaged bead-apex B to the tire building machine TBM, as shown in FIGS. 9-11. As a result, the one spacer S1, S2 is empty. The transfer unit 6 is also arranged for placing said empty spacer S1, S2, as shown in FIGS. 9 and 10, at the second section 17 of the platform. Each bead-apex B may be separated from spacer S on which it is supported prior to, during or after the transfer of the respective spacer S from the first section 16 to the second section 17, depending on the configuration of the transfer unit 6.

As best seen in FIG. 2, the transfer unit 6 comprises a manipulator 61 for engaging and carrying the one or more bead-apexes B from the transfer station T to the tire building machine TBM and a manipulator base 60 for supporting said manipulator 61. The manipulator base 60 is fixed relative to the transfer station T. Hence, the range of movement of the manipulator 61 relative to the manipulator 60 is limited. In this exemplary embodiment, the manipulator 61 comprises a robotic arm 62 and a bead-apex gripper 63 supported by said robotic arm 62. Said robotic arm 62 typically has six degrees of freedom. Said bead-apex gripper 63 may have a conventional configuration similar to the bead-apex gripper disclosed in EP 2 328 745 B1. In particular, said bead-apex gripper 63 has independently operable spacer engagement jaws 64 and bead-engagement jaws 65 to pick up one of the spacers S and to pick up and separate the bead-apex B from said one spacer S, respectively, in a manner known per se from EP 2 328 745 B1.

Figure 18:
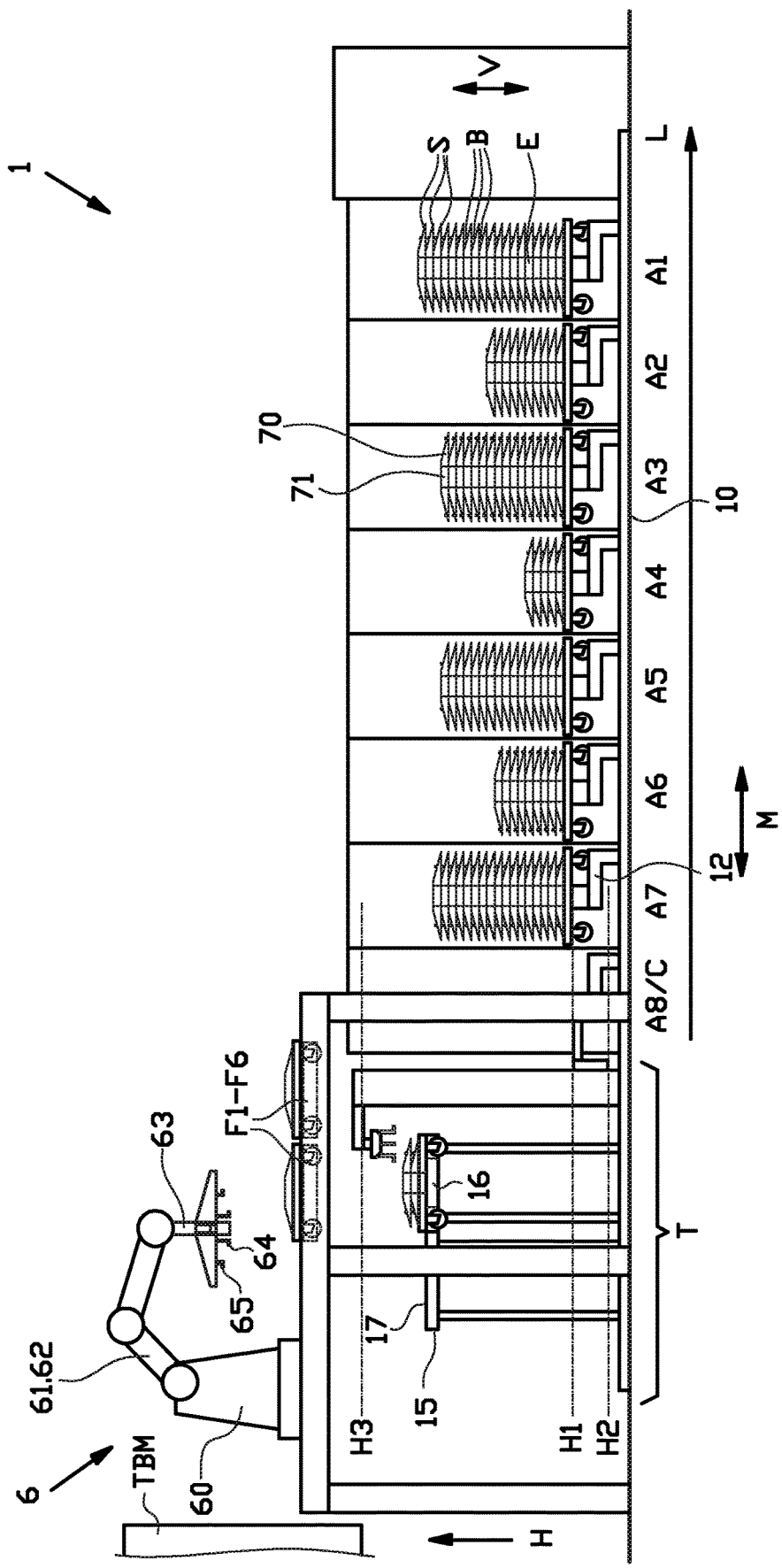

As best seen in FIG. 18, the bead-apex storage system 1 further comprises one or more buffer stations F1-F6, in this example six buffer stations F1-F6, for holding empty carriers 9. As shown in FIG. 2, the one or more buffer stations F1-F6 are out of reach of the spacer gripper 3, yet within range of the transfer unit 6. The transfer unit 6 may transfer an empty carrier 9 from the first section 16 of the platform 15 to any one of the buffer stations F1-F6. The same transfer unit 6 is arranged for transferring a carrier 9 from a respective one of the buffer stations F1-F6 to the first section 16 of the platform 15. Subsequently, the spacer gripper 3 is arranged to engage the transferred carrier 9 at the first section 16. The engaged transferred carrier 9 may then be moved into any one of the plurality of storage stations A1-A8 that is empty.

Figure 15:
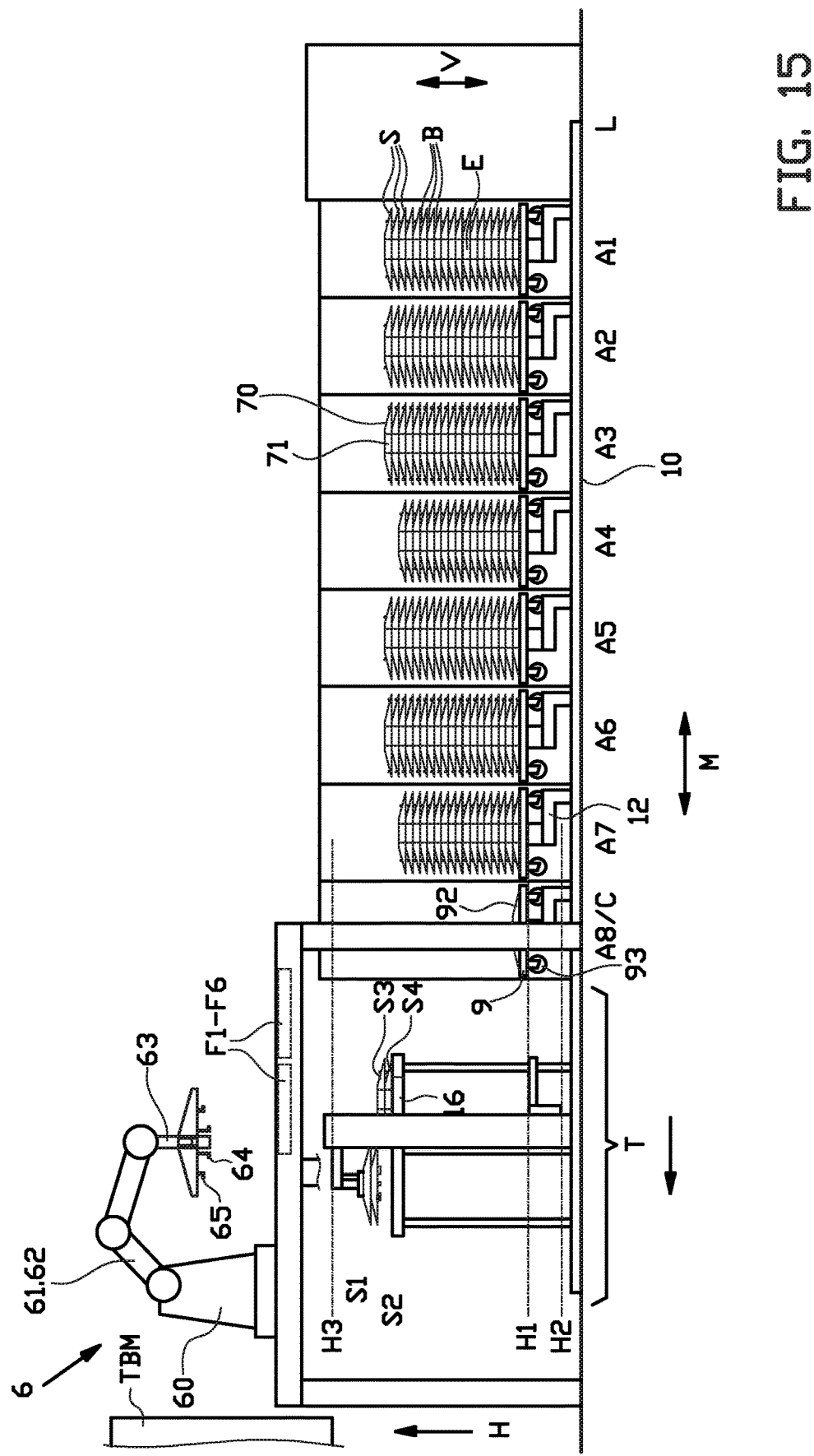
Figure 16:
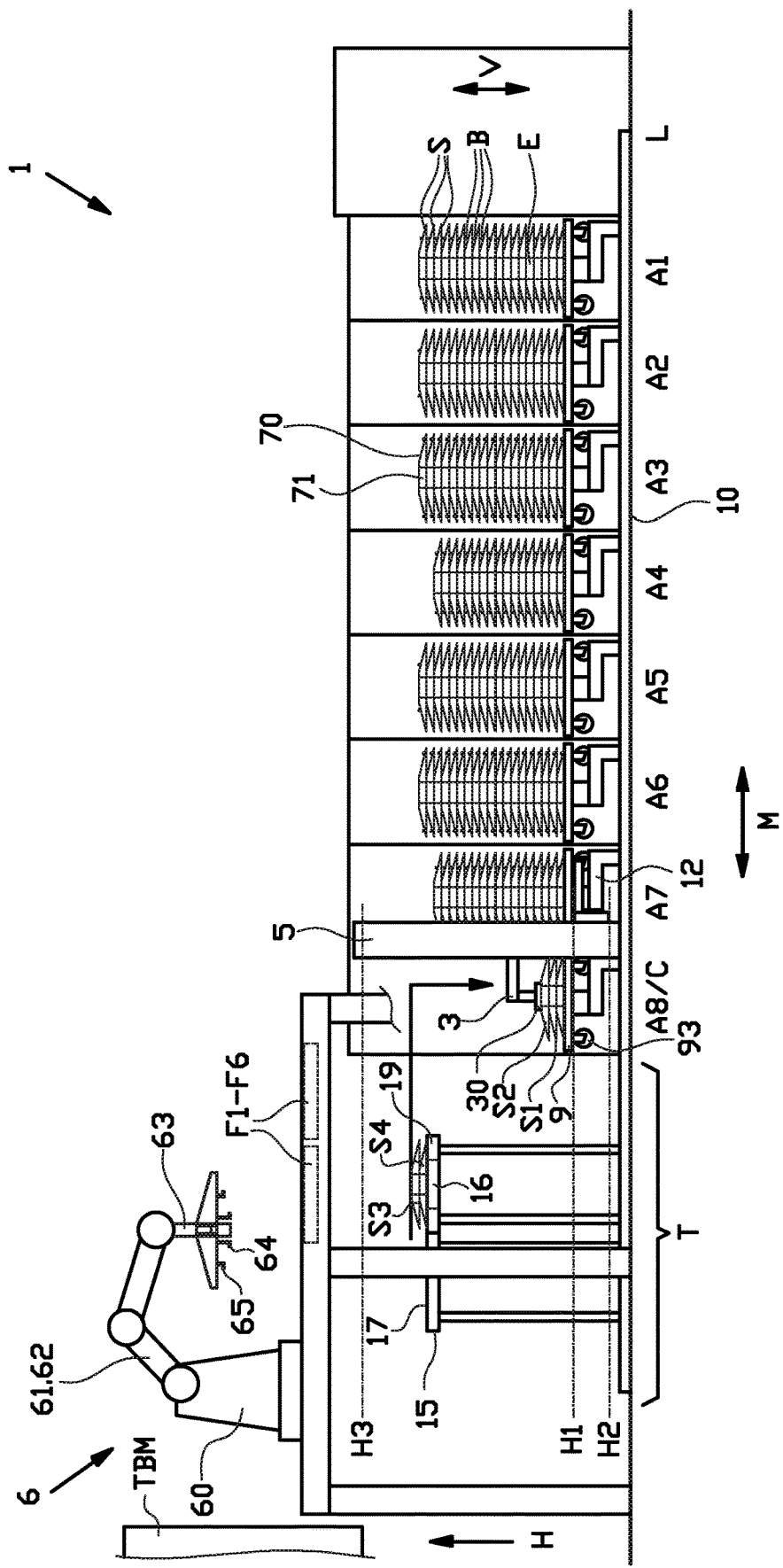

As shown in FIGS. 1 and 2, the bead-apex storage system 1 may further comprise at least one spacer collection station C for collecting stacks of empty spacers S. Said spacer collection station C may be a separate station to the plurality of storage stations A1-A8, or one of the storage stations A1-A8 may be designated as spacer collection station C at any point during the process. In this exemplary embodiment, the spacer collection station C is not different from the storage stations A1-A8 and/or is one of the storage stations A1-A8, in particular the last storage station A8 before the transfer station T. Hence, the spacer collection station C is located between the transfer station T and the storage station A7 of the plurality of storage stations closest to said transfer station T. The spacer collection station C is arranged to collect empty spacers S emptied during the transfer of the bead-apexes B to the tire building machine TBM in the transfer station T. To this end, an empty carrier 9 may be provided in the spacer collection station C to receive and/or stack the empty spacers S thereon, as shown in FIGS. 15 and 16. The carrier 9 with the empty spacer S may subsequently be engaged by the carrier gripper 2 to be moved to the loading station L for unloading from the bead-apex storage system 1.

A method for handling a plurality of carriers 9 with the use of the aforementioned bead-apex storage system 1 will be briefly elucidated below with reference to FIGS. 1-18.

FIGS. 1 and 2 show the situation in which full carriers 9, i.e. carriers 9 with stacks of bead-apexes B alternated with spacers S, are loaded into the bead-apex storage system 1. One of said full carriers 9 is placed in the loading station L. It is noted that—instead of loading the full carriers 9 into the bead-apex storage system 1 via the loading station L, the full carriers 9 may also be loaded directly into the storage stations A1-A8, i.e. via the back of said storage stations A1-A8.

FIG. 3 shows the situation in which the carrier gripper 2 has been moved in the main direction M into the loading station L to engage the full carrier 9. FIG. 4 shows the situation in which the carrier gripper 2 has been moved in the main direction M into a position in which the full carrier 9, in the storage direction D, is aligned with the storage station A4 to be loaded. If not done so already, the carrier gripper 2 is raised up to the lifting level, as for example shown in FIG. 2, to lift the full carrier 9 to a level above the support 12 of the respective storage station A4. FIG. 5 shows the situation in which the carrier gripper 2 is moved in the storage direction D into the respective storage station A4 to load the full carrier 9 supported thereon into the respective storage station A4. A mentioned before, the carrier gripper 2 is subsequently lowered to the releasing level H, as for example shown in FIG. 7, to release the full carrier 9.

Figure 6:
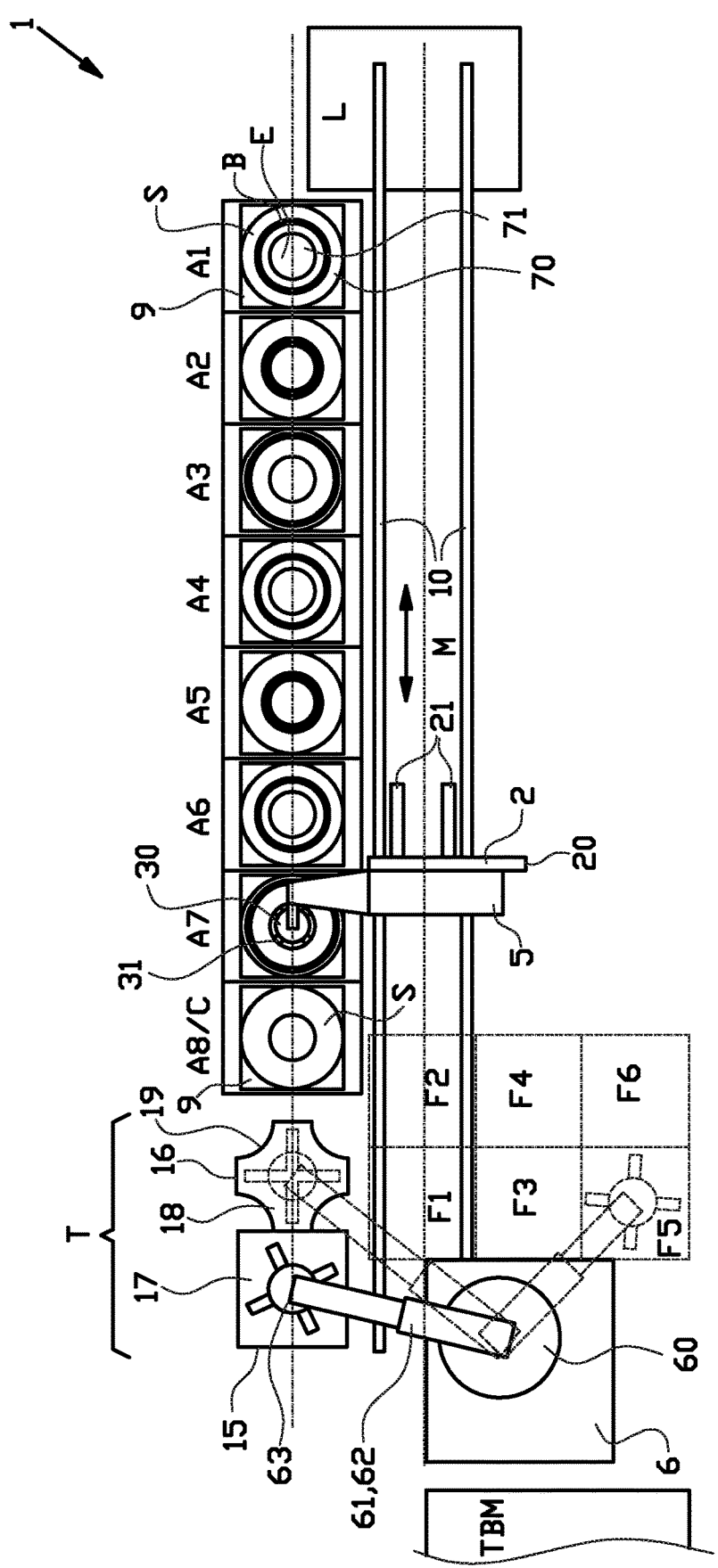

FIG. 6 shows the situation in which several carriers 9 with stacks of bead-apexes B of different specification, i.e. different diameters, are loaded into the bead-apex storage system 1 by repeating the steps of FIGS. 1-5. The spacer gripper 3 is now moved in the main direction M into a position in which its gripper head 30 is in alignment with a stack on one of the carriers 9 in the height direction H and/or the stacking direction V. FIG. 7 shows the situation in which the spacer gripper 3 has been moved towards the stack in the height direction H and/or the stacking direction V to pick up and/or lift one or more of the spacers S1, S2 from said stack. In this exemplary embodiment, the spacer gripper 3 lifts two spacers S1, S2 from the stack simultaneously.

FIG. 8 shows the situation in which the spacer gripper 3 is moved in the main direction M into the transfer station T to release and/or deposit the one or more lifted spacers S1, S2 onto the platform 15, in particular at the first section 16 thereof. FIG. 9 shows the situation in which the spacer gripper 3 has been moved out of or clear from the transfer station T in the main direction M. Simultaneously or shortly thereafter, the transfer unit 6 has moved in to engage one of the one or more spacers S1, S2, in this case the first spacer S1 in the upper position. FIG. 10 shows the situation in which the transfer unit 6 has moved and placed said engaged first spacer S1 at the second section 17 of the platform 15. The bead-apex B1 supported on said first spacer S1 is separated from the first spacer S1 during the movement of said first spacer S1 from the first section 16 to the second section 17 or after the placement of said first spacer S1 at the second section 17. The separated bead-apex B1 is then transferred to the tire building machine TBM, i.e. to a bead-loader, known per se, of said tire building machine TBM, while the empty first spacer S1 remain behind in the second section 17.

Figure 12:
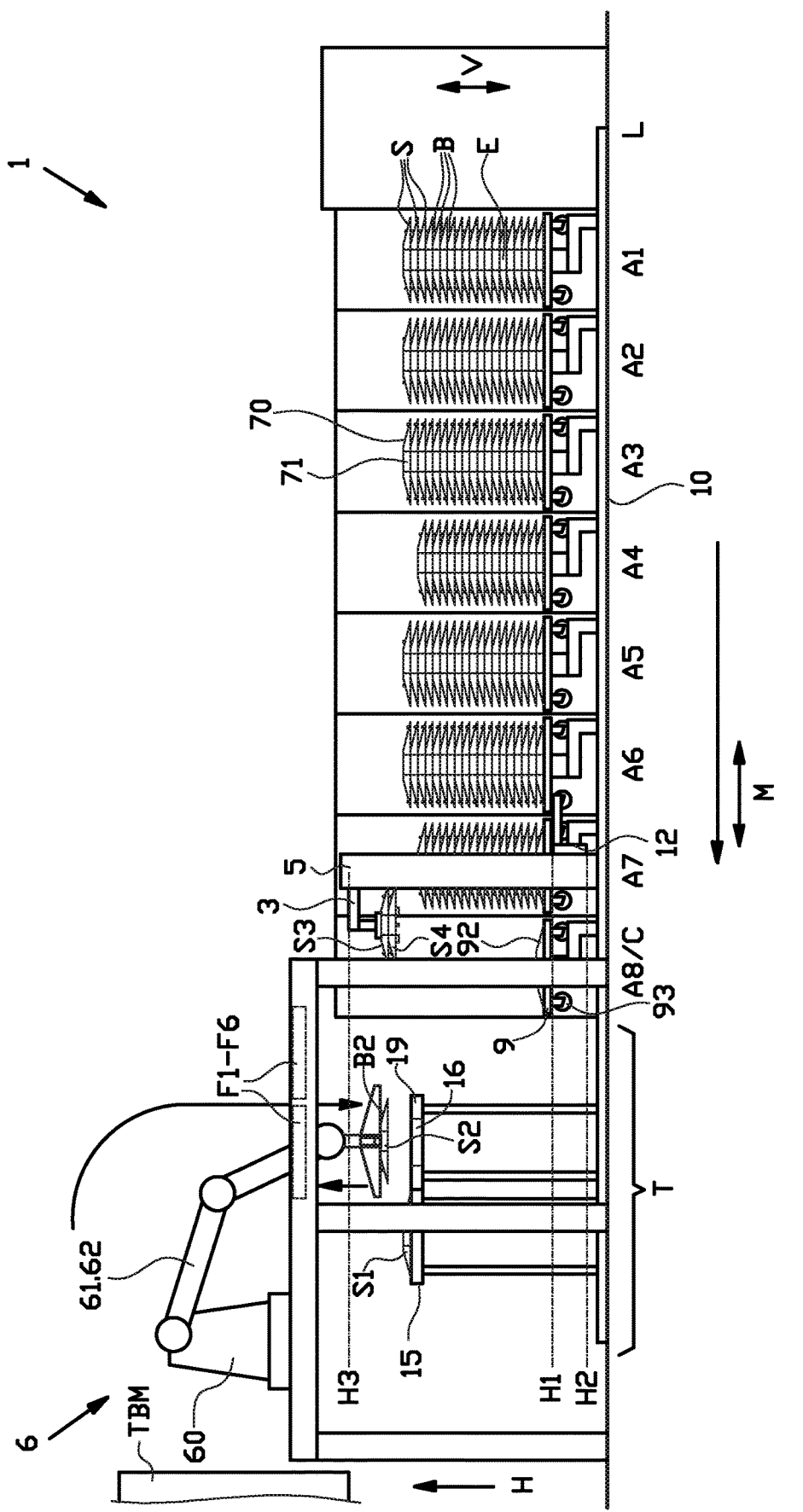
Figure 13:
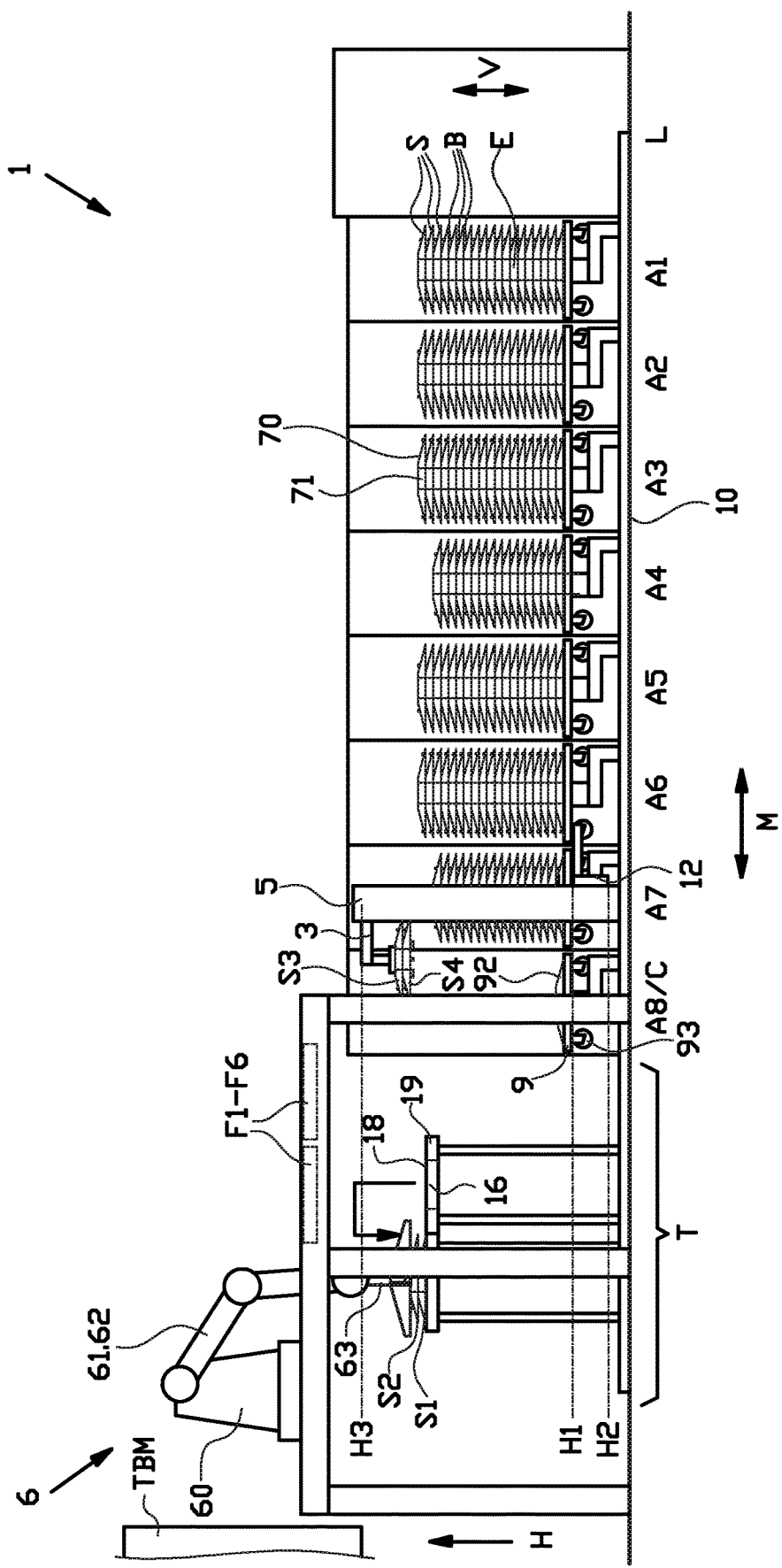
Figure 14:
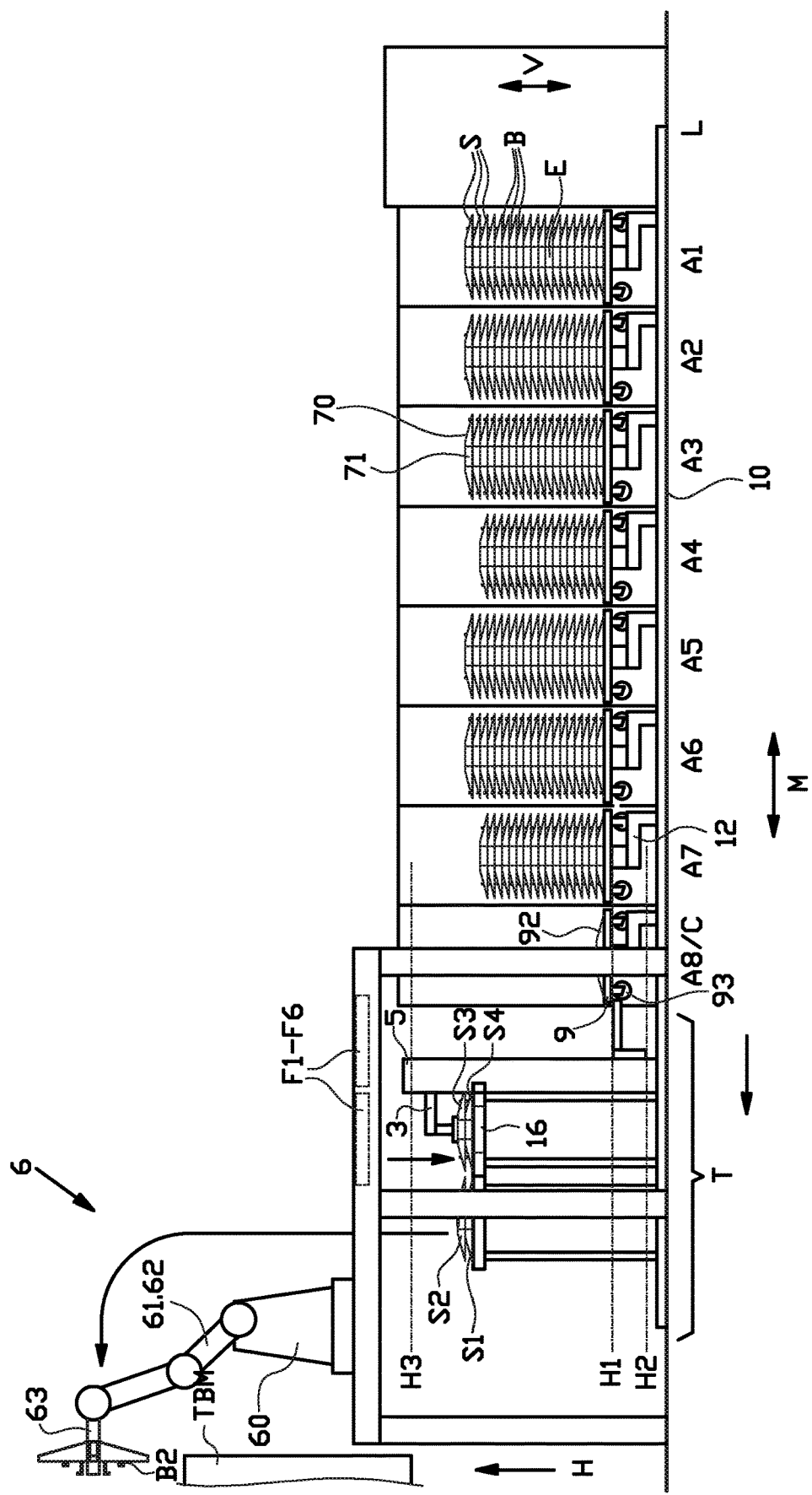

FIGS. 12, 13 and 14 show how the aforementioned steps of FIGS. 9, 10 and 11 are repeated for the second spacer S2 in the lower position and the second bead-apex B2 supported thereon. The second spacer S2 is placed on top of the first spacer S1 in the second section 17.

Figure 17:
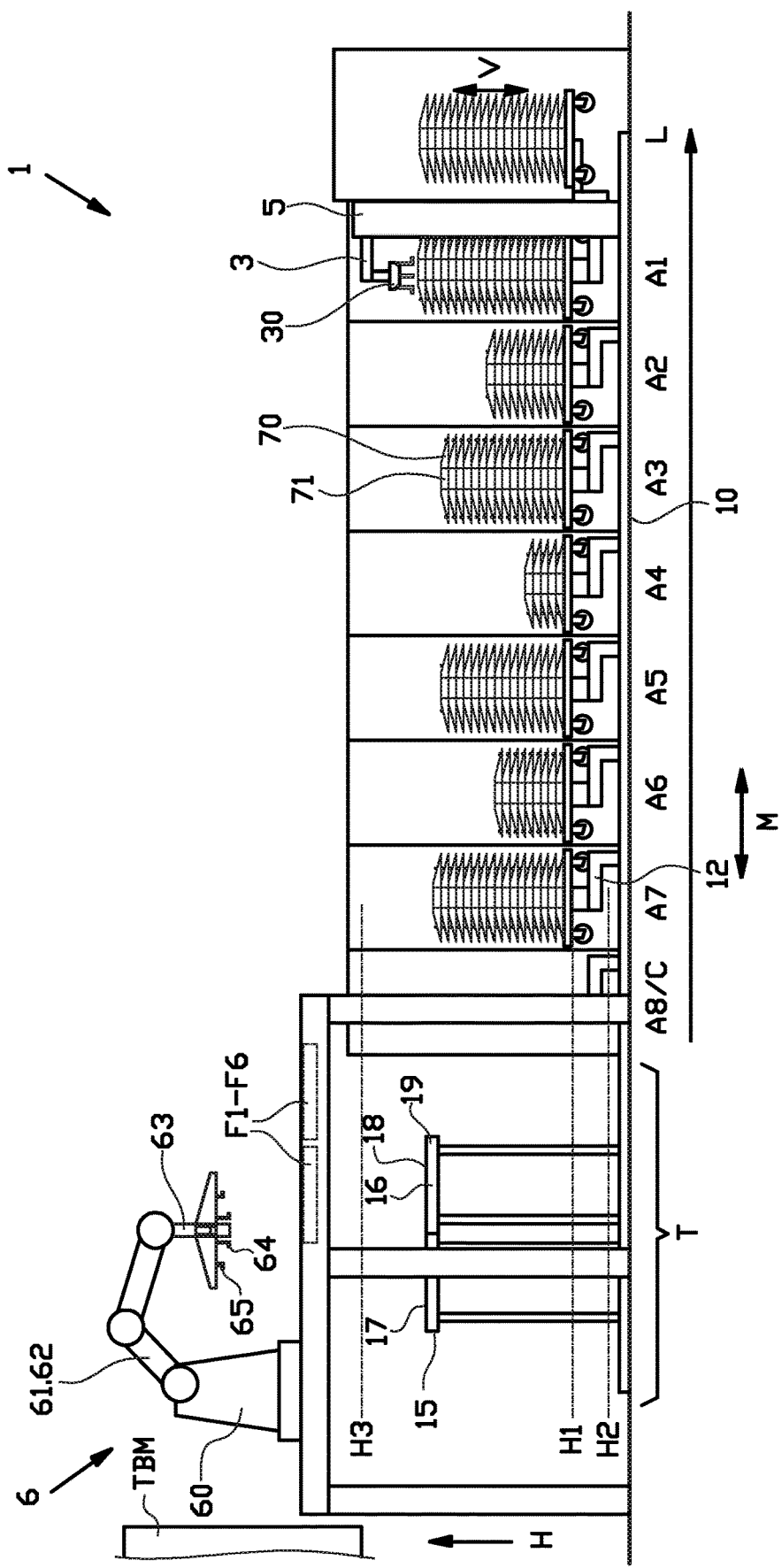

Note that during the transfer steps in FIGS. 9-14, the spacer gripper 3 may be moved to any one of the storage stations A1-A8 to pick up a further one or more spacers S3, S4 for the next transfer cycle. In particular, in FIG. 14, the further one or more spacers S3, S4 are already placed by the spacer gripper 3 at the first section 16 of the platform 15 while the empty spacers S1, S2 from the previous transfer cycle are ready to be moved out of the transfer station T to the spacer collection station C, as shown in FIGS. 15 and 16. FIG. 17 shows the situation in which the several transfer cycles have occurred, reflected by several stacks being reduced in height. The carrier 9 at the spacer collection station C has been filled with empty spacers S, which are now being carried out by the carrier gripper 3 that has moved with said stack of empty spacers S to the loading station L.

Figure 19:
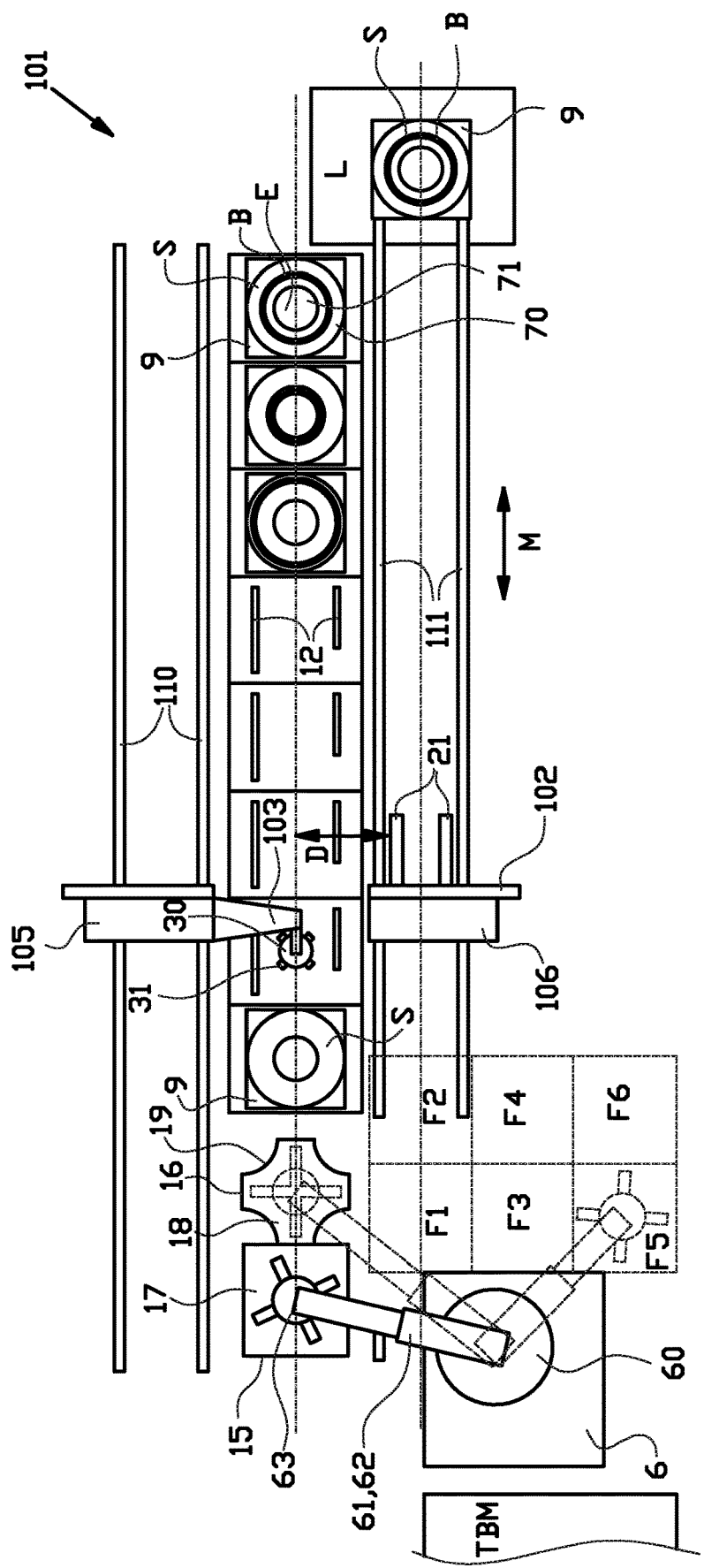
FIG. 19 shows a top view of an alternative bead-apex storage system according to a second embodiment of the invention.

FIG. 19 shows an alternative bead-apex storage system 101 according to an exemplary second embodiment of the invention, which differs from the previously discussed bead-apex storage system 1 only in that it comprises a spacer gripper base 105 and a carrier gripper base 106 for separately and/or independently supporting the spacer gripper 103 and the carrier gripper 102, respectively. Hence, the spacer gripper base 105 and the carrier gripper base 106 of this alternative embodiment are independently movable from the transfer station T to any one of the storage stations A1-A8 and from the loading station L to any one of the storage stations A1-A8, respectively. More in particular, to prevent interference between the grippers 102, 103, the spacer gripper base 105 is movable from the transfer station T to any one of the storage stations A1-A8 at a first side of the plurality of storage stations A1-A8 and the carrier gripper base 106 is movable from the loading station L to any one of the storage stations A1-A8) at a second side of the plurality of storage stations (A1-A8 opposite to the first side.

In this exemplary embodiment, the one or more guides 110, 111 comprises a first guide or rail 110 at the first side of the plurality of storage stations A1-A8 and a second guide or rail 111 at the second side of the plurality of storage stations A1-A8. The first guide 110 only needs to extend from the transfer station T up to any of the storage stations A1-A8. The second guide 111 only needs to extend from the loading station L up to any of the storage stations A1-A8.

Figure 20:
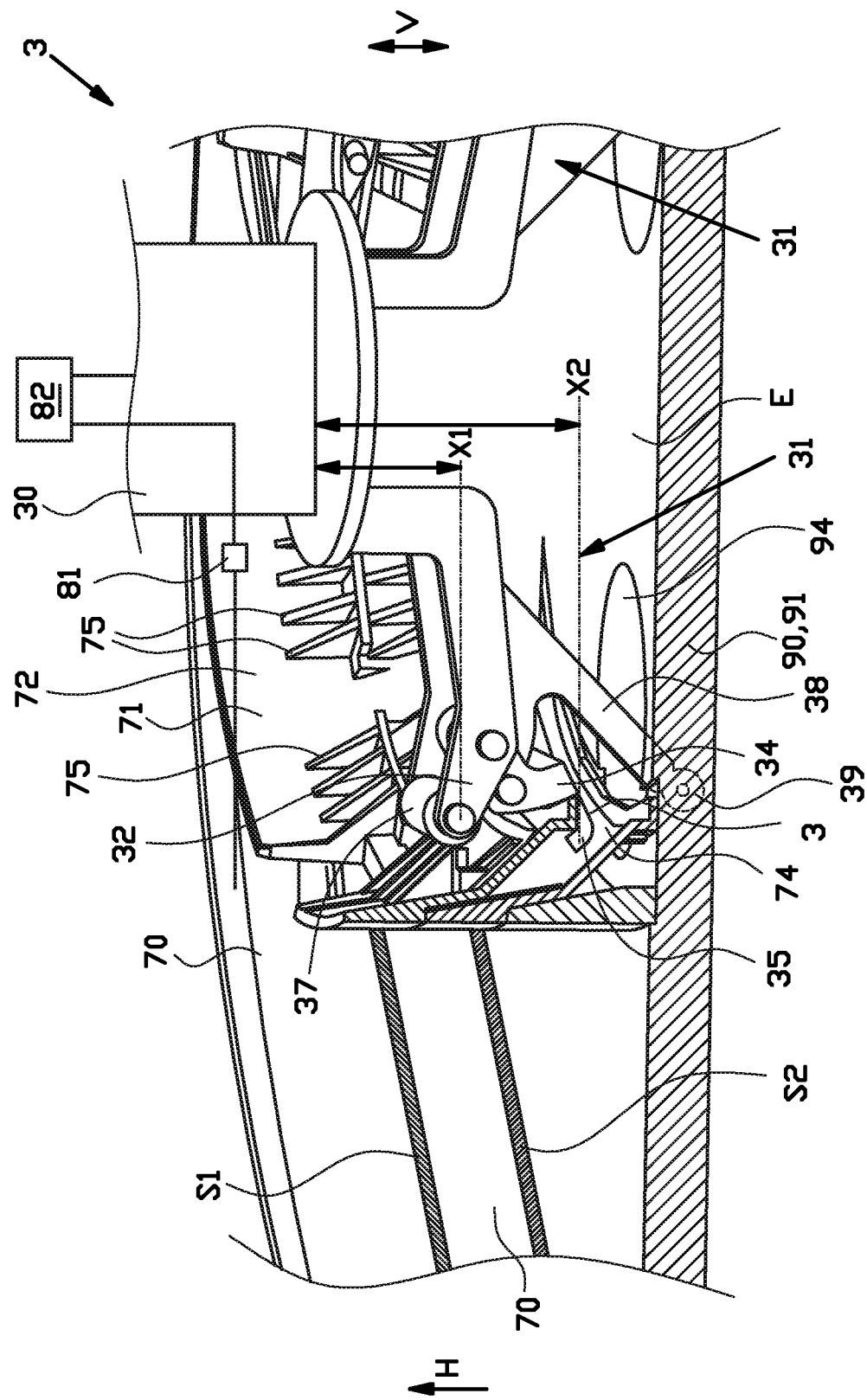
FIG. 20 shows a perspective view in cross section of a spacer gripper that is used in the bead-apex storage system according to FIGS. 1-19.
Figure 21:
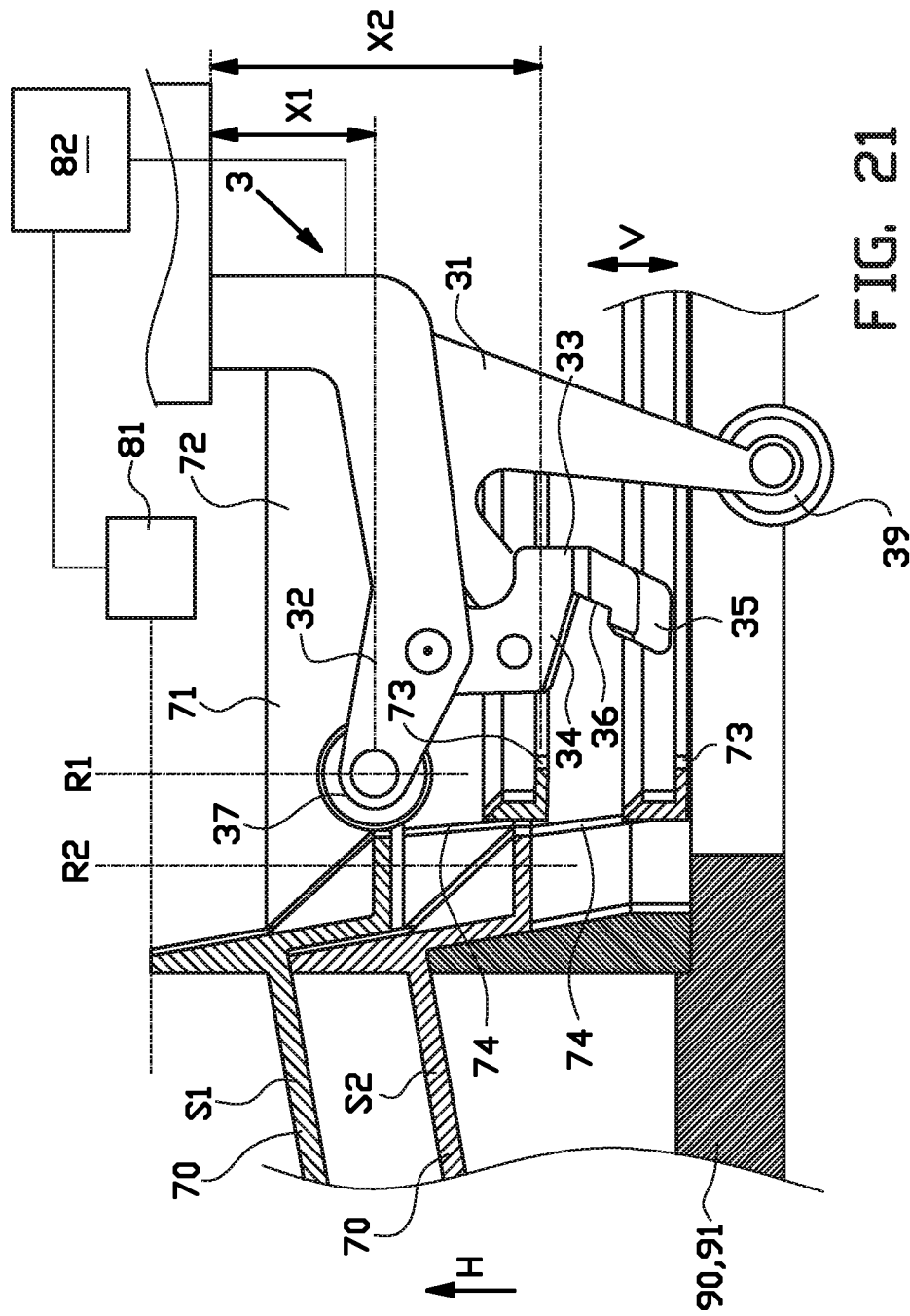

FIGS. 20, 21 and 22 show a possible configuration of the spacer gripper 3 that allows said spacer gripper 3 to pick-up, engage and/or lift two spacers S1, S2 simultaneously.

Generally, the plurality of spacer engagement members 31 are arranged to reach into the central space E of the respective stack up to or at least up to a second spacer S2 of the respective stack from the top of the respective stack. The plurality of spacer engagement members 31 are subsequently movable into an engagement position, as shown in FIG. 22, for engaging said second spacer S2 to lift said second spacer S2 from the respective stack simultaneously with the spacer S1 at the top of the respective stack. The spacer S1 at the top of the respective stack does not need to be engaged itself. It is merely lifted together with the second spacer S2 because it is supported on said second spacer S2.

Optionally, each spacer engagement member 31 may comprise a first element 32 at a first distance X1 from the gripper head 30 for contacting a first spacer S1 at the top of the respective stack and a second element 33 at a second distance X2 from the gripper head 30, greater than the first distance X1, to engage the second spacer S2 from the top of the respective stack. The first element 32 may be used to aligned the first spacer S1 with respect to the rest of the stack during the insertion of the spacer gripper 3 into the central space E of the stack or to align the first spacer S1 with respect to the second spacer S2.

In an at least partially automated embodiment of the spacer gripper 3, the bead-apex storage system 1 comprises a detector 81 for detecting the position of the plurality of spacer engagement members 31 in the stacking direction V and/or the height direction H relative to the spacers S in the respective stack. The bead-apex storage system 1 further comprises a control unit 82 that is operationally connected to the detector 81 and the spacer gripper 3. Said control unit 82 is arranged, configured, adapted and/or programmed for controlling the plurality of spacer engagement members 31 to engage the second spacer S2 from the top of the respective stack when the plurality of spacer engagement members 31 are positioned in the stacking direction V and/or the height direction H at said second spacer S2 from the top of the respective stack.

It is noted that the same principle may also be used to simultaneously lift more than two spacers from the stack. However, the spacer gripper 3 is not intended to lift and carry an entire stack of spacers from one of the carriers 9 to the transfer station T. Realistically, the spacer gripper 3 will lift up to four spacers at the same time. The same spacer gripper 3 may however also be used to lift only one spacer from the stack, if so desired.

For the specific design of the spacers S1, S2 as shown in FIGS. 20, 21 and 22, a special configuration of the spacer gripper 3 is proposed to take into account the specific characteristics of the design. In particular, it is noted that each spacer S1, S2 comprises a spacer body 70 that defines a circumferential wall 72 that ends with an inner edge 73. The inner edge 73 defines an inner radius R1 of the central aperture 71 of said spacer S1, S2. The spacer body 70 further comprises an engagement recess 74 in said circumferential wall 72 in the stacking direction V above the inner edge 73 for receiving one of the spacers engagement members 31. Said engagement recess 74 is located at an engagement radius R2 that is larger than the inner radius R1. Hence, the engagement recess 74 of the second spacer S2 is located behind the inner edge 73 of the first spacer S1. Consequently, a spacer engagement member 31 is required that can pass through the central aperture 71 within the inner radius R1 and then move and/or hook below inner edge 73 of the first spacer S1 to engage the engagement recess 74 of the second spacer S2.

For this purpose, each spacer engagement member 31 comprises a hook that has a first hook part 34 that in the engagement position, as shown in FIG. 22, is arranged to hook around the inner edge 73 of the spacer S1 at the top of the stack and a second hook part 35 that in the engagement position is arranged to engage with the engagement recess 74 of the second spacer S2 from the top of the stack.

The hook part 35 may feature an inner contour 36 that is arranged to extend around the inner edge 73 of the first spacer S1 without contacting before the spacer engagement member 31 reaches the engagement position, as shown in FIG. 22.

As further shown in FIGS. 20-22, in this specific example, each spacer S1, S2 comprises a plurality of ribs 75 to provide rigidity to the circumferential wall 72. The first element 32 of the spacer gripper member 31 may be provided with a centering roller 37 to roll over said ribs 75, thereby aligning the first spacer S1 at the top of the stack in the process. In this way, the stack as a whole can be centered.

Each spacer engagement member 31 may further comprise a separator part 38 to separate the second spacer S2 from any further spacers S below. In particular, the separator part 38 may be tilted into a position in which it pushes the further spacers S downwards in the stacking direction V, while the top two spacers S1, S2 are being lifted from the stack, as schematically shown with the arrows in FIG. 22. In this exemplary embodiment, the separator part 38 is provided with a separator roller 39 to roll over the further spacers S as the separator part 38 is tilted into position.

In the situation as shown in FIG. 22, the spacer gripper 3 has already reached the bottom of the stack. The second spacer S2 is actually the spacer member on top of the carrier base 90, i.e. the pallet 91. Note that the carrier base 90 may be provided with a recess 94 to accommodate the separator part 38 in the engagement position.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

LIST OF REFERENCE NUMERALS 1 bead-apex storage system
10 guide
12 support
15 platform
16 first section
17 second section
18 support surface
19 recess
2 carrier gripper
20 fork mount
21 fork
3 spacer gripper
30 gripper head
31 spacer engagement member
32 first element
33 second element
34 first hook part
35 second hook part
36 inner contour
37 centering roller
38 separator part
39 separator roller
5 common gripper base, spacer/carrier gripper base
6 transfer unit
60 manipulator base
61 manipulator
62 robotic arm
63 bead-apex gripper
64 spacer engagement jaw
65 bead engagement jaw
70 spacer body
71 central aperture
72 circumferential wall
73 inner edge
74 engagement recess
75 rib
81 detector
82 control unit 9 carrier
90 pallet
91 base
92 spacer member
93 wheels
94 recess
101 alternative bead-apex storage system
102 carrier gripper
103 spacer gripper
105 spacer gripper base
106 carrier gripper base
110 first guide
111 second guide
A1-A8 storage stations
B bead-apex
B1 first bead-apex
B2 second bead-apex
C spacer collection station
D storage direction
E central space
F1-F6 buffer stations
H height direction
H1 lifting level
H2 releasing level
H3 transfer level
L loading station
M main direction
R1 inner radius
R2 engagement radius
S spacer
S1 first spacer
S2 second spacer
S3 third spacer
S4 fourth spacer
T transfer station
TBM tire building machine
X1 first distance
X2 second distance
V stacking direction

The invention claimed is:

1. A bead-apex storage system for handling a plurality of carriers, wherein each carrier is arranged to support a stack of bead-apexes stacked in a stacking direction and alternated with spacers separating the bead-apexes from each other in said stacking direction, wherein the bead-apex storage system comprises a plurality of storage stations for storing the carriers and a transfer station for transferring one of the plurality of bead-apexes to a tire building machine, wherein the bead-apex storage system further comprises a spacer gripper for lifting one or more of the spacers with bead-apexes supported thereon from one of the carriers in one of the plurality of storage stations and for carrying said one or more lifted spacers to the transfer station, wherein the bead-apex storage system comprises a spacer gripper base for supporting the spacer gripper, wherein the spacer gripper base is movable from the transfer station to any of the plurality of storage stations, wherein the spacer gripper is arranged for releasing the one or more lifted spacers in the transfer station, wherein the bead-apex storage system further comprises a transfer unit for transferring one or more bead-apexes from the released one or more spacers in the transfer station to the tire building machine, wherein the transfer station comprises a platform with a first section for receiving the one or more released spacers from the spacer gripper and a second section for receiving one or more of the released spacers that are empty when the transfer unit has transferred the respective bead-apexes supported thereon to the tire building machine.

2. The bead-apex storage system according to claim 1, wherein the bead-apex storage system further comprises a loading station for loading one of the carriers into the bead-apex storage system and a carrier gripper for engaging said one carrier in the loading station and for moving said one engaged carrier to any of the plurality of storage stations.

3. The bead-apex storage system according to claim 2, wherein the carrier gripper is supported by the spacer gripper base, wherein said spacer gripper base is movable from the loading station and the transfer station to any of the storage stations.

4. The bead-apex storage system according to claim 1, wherein the plurality of storage stations are located in-line in a main direction.

5. The bead-apex storage system according to claim 4, wherein the transfer station and the plurality of storage stations are located in-line in the main direction.

6. The bead-apex storage system according to claim 4, wherein the spacer gripper base is movable in the main direction.

7. The bead-apex storage system according to claim 4, wherein the bead-apex storage system comprises one or more guides extending in the main direction, wherein the spacer gripper base is movable along at least one of the one or more guides.

8. The bead-apex storage system according to claim 2, wherein the bead-apex storage system comprises a carrier gripper base for supporting the carrier gripper, wherein the spacer gripper base and the carrier gripper base are independently movable from the transfer station to any of the storage stations and from the loading station to any of the storage stations, respectively.

9. The bead-apex storage system according to claim 8, wherein the plurality of storage stations are located in-line in a main direction, wherein the spacer gripper base is movable from the transfer station to any of the storage stations at a first side of the plurality of storage stations and the carrier gripper base is movable from the loading station to any of the storage stations at a second side of the plurality of storage stations opposite to the first side.

10. The bead-apex storage system according to claim 9, wherein the carrier gripper base is movable in the main direction.

11. The bead-apex storage system according to claim 2, wherein the plurality of storage stations are located in-line in a main direction, wherein the carrier gripper is movable in a storage direction transverse or perpendicular to the main direction for loading and unloading a respective one of the carriers into and from a respective one of the plurality of storage stations.

12. The bead-apex storage system according to claim 11, wherein each storage station comprises a support for one of the carriers, wherein the carrier gripper is movable into and retractable out of each storage station in the storage direction at a lifting level above the respective support and a releasing level below the respective support, wherein the carrier gripper is further movable in a height direction perpendicular to the main direction and the storage direction through the respective support between the lifting level and the releasing level.

13. The bead-apex storage system according to claim 9, wherein each carrier comprises a pallet, wherein the carrier gripper comprises a fork to engage and carry one of said pallets.

14. The bead-apex storage system according to claim 1, wherein each spacer has a central aperture, wherein the central apertures of the spacers in a respective one of the stacks of bead-apexes are aligned in the stacking direction to form a central space, wherein the spacer gripper comprises a gripper head and a plurality of spacer engagement members protruding from said gripper head for reaching into the central space of the respective stack to engage one of the spacers in said respective stack.

15. The bead-apex storage system according to claim 14, wherein the plurality of spacer engagement members are arranged to reach into the central space of the respective stack at least up to a second spacer of the respective stack from the top of the respective stack, wherein the plurality of spacer engagement members are movable into an engagement position for engaging said second spacer to lift said second spacer from the respective stack simultaneously with the spacer at the top of the respective stack.

16. The bead-apex storage system according to claim 15, wherein each spacer engagement member comprises a first element at a first distance from the gripper head for contacting a first spacer at the top of the respective stack and a second element at a second distance from the gripper head, greater than the first distance, to engage the second spacer from the top of the respective stack.

17. The bead-apex storage system according to claim 14, wherein the bead-apex storage system comprises a detector for detecting a position of the plurality of spacer engagement members in the stacking direction relative to the spacers in the respective stack and a control unit that is operationally connected to the detector and the spacer gripper and programmed for controlling the plurality of spacer engagement members to engage a second spacer from the top of the respective stack when the plurality of spacer engagement members are positioned in the stacking direction at said second spacer from the top of the respective stack.

18. The bead-apex storage system according to claim 14, wherein each spacer engagement member comprises a centering roller insertable into the central space of the stack for centering one or more of the spacers or the stack as a whole with respect to the spacer gripper.

19. The bead-apex storage system according to claim 1, wherein the transfer unit comprises a manipulator for engaging and carrying the one or more bead-apexes from the transfer station to the tire building machine and a manipulator base for supporting said manipulator, wherein the manipulator base is fixed relative to the transfer station.

20. The bead-apex storage system according to claim 19, wherein the manipulator comprises a robotic arm and a bead-apex gripper supported by said robotic arm.

21. The bead-apex storage system according to claim 1, wherein each carrier comprises a carrier base and a spacer member integrated with or fixedly connected to said carrier base, wherein the spacer gripper is arranged to engage and carry the respective carrier by engaging and carrying the spacer member thereof, wherein the first section is arranged to receive a respective one of said carriers.

22. The bead-apex storage system according to claim 21, wherein each carrier comprises a plurality of wheels connected to the carrier base at a side of the carrier base facing away from the spacer member, wherein the platform at the first section comprises a support surface and recesses in said support surface for accommodating said plurality of wheels below the support surface.

23. The bead-apex storage system according to claim 21, wherein the bead-apex storage system further comprises one or more buffer stations for holding carriers, wherein the transfer unit is arranged for transferring a carrier between a respective one of the buffer stations and the first section of the platform, wherein the spacer gripper is arranged to engage the transferred carrier at the first section.

24. The bead-apex storage system according to claim 1, wherein the spacer gripper is movable with respect to the spacer gripper base in a height direction.

25. The bead-apex storage system according to claim 24, wherein the transfer station comprises a platform for receiving the one or more released spacers from the spacer gripper, wherein said platform is raised with respect to the plurality of storage stations, wherein the spacer gripper is movable in the height direction up to a transfer level above the platform.

26. The bead-apex storage system according to claim 1, wherein the spacer gripper is movable in three degrees of freedom or less.

27. The bead-apex storage system according to claim 1, wherein the plurality of storage stations comprises at least four storage stations.

28. The bead-apex storage system according to claim 1, wherein the bead-apex storage system further comprises at least one spacer collection station for collecting stacks of empty spacers.

29. The bead-apex storage system according to claim 28, wherein the at least one spacer collection station is located between the transfer station and the storage station of the plurality of storage stations closest to said transfer station.

30. A method for handling a plurality of carriers with a bead-apex storage system according to claim 1, wherein the method comprises the step of:
    using the spacer gripper to lift one or more of the spacers from one of the carriers in a respective one of the plurality of storage stations and to carry said one or more lifted spacers to the transfer station.

31. The method according to claim 30, wherein the method further comprises the steps of:
    releasing the one or more lifted spacers from the spacer gripper in the transfer station; and
    transferring one or more of the plurality of bead-apexes from the one or more released spacers in the transfer station to the tire building machine.

32. The method according to claim 31, wherein the method further comprises the step of:
    using the spacer gripper to engage a further one or more of the spacers from one of the carriers in a respective one of the plurality of storage stations and to carry said lifted one or more further spacers to the transfer station while the step of transferring of the one or more of the plurality of bead-apexes from the previously released one or more spacers in the transfer station to the tire building machine is taking place.

33. The method according to claim 30, wherein the spacer gripper simultaneously lifts two of the spacers from one of the carriers in a respective one of the plurality of storage stations, wherein the method further comprises the steps of:
    releasing the two simultaneously lifted spacers from the spacer gripper in the transfer station with a first spacer of the two simultaneously lifted spacers in an upper position and a second spacer of the two simultaneously lifted spacers in a lower position;

separating a respective one of the bead-apexes from the first spacer and placing the first spacer at a side of the second spacer; and separating a respective one of the bead-apexes from the second spacer and placing the second spacer on top of the first spacer.

34. The method according to claim 33, wherein the bead-apex storage system further comprises at least one spacer collection station for collecting stacks of empty spacers, wherein the method further comprises the step of:

using the spacer gripper to collect the first spacer and the second spacer from the transfer station and to move said first spacer and said second spacer to the spacer collection station.

35. The method according to claim 34, wherein the method comprises the step of placing an empty carrier in said at least one spacer collection station for supporting the stack of empty spacers.

36. The method according to claim 30, wherein the bead-apex storage system further comprises a loading station and a carrier gripper, wherein the method further comprises the steps of:

receiving a carrier in the loading station;

using the carrier gripper to engage the carrier in the loading station and to move the engaged carrier to any of the plurality of storage stations.

37. The method according to claim 36, wherein the method further comprises the step of:

using the carrier gripper to engage a stack of empty spacers in a spacer collection station and to carry said engaged stack of empty spacers to the loading station.

38. The method according to claim 30, wherein the first section is further arranged to receive a respective one of the carriers, wherein the bead-apex storage system further comprises one or more buffer stations for holding carriers, wherein the method further comprises the steps of:

transferring one of the carriers between a respective one of the buffer stations and the first section of the platform; and using the spacer gripper to engage the transferred carrier at the first section.

\* \* \* \* \*